United States Patent
Yamanaka et al.

(10) Patent No.: US 9,957,388 B2
(45) Date of Patent: May 1, 2018

(54) POLYBUTYLENE TEREPHTHALATE RESIN COMPOSITION AND MOLDED ARTICLE

(71) Applicant: MITSUBISHI ENGINEERING-PLASTICS CORPORATION, Minato-ku (JP)

(72) Inventors: Yasushi Yamanaka, Hiratsuka (JP); Souki Yoshida, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 154 days.

(21) Appl. No.: 14/652,642

(22) PCT Filed: Jan. 9, 2014

(86) PCT No.: PCT/JP2014/050212
§ 371 (c)(1),
(2) Date: Jun. 16, 2015

(87) PCT Pub. No.: WO2014/109352
PCT Pub. Date: Jul. 17, 2014

(65) Prior Publication Data
US 2015/0368459 A1    Dec. 24, 2015

(30) Foreign Application Priority Data

| | | |
|---|---|---|
| Jan. 10, 2013 | (JP) | 2013-002249 |
| Aug. 28, 2013 | (JP) | 2013-176567 |
| Sep. 10, 2013 | (JP) | 2013-187039 |
| Oct. 24, 2013 | (JP) | 2013-221066 |
| Oct. 24, 2013 | (JP) | 2013-221075 |

(51) Int. Cl.
*C08K 3/22* (2006.01)
*C08L 67/03* (2006.01)
*C08L 23/00* (2006.01)
*C08L 67/02* (2006.01)

(52) U.S. Cl.
CPC ............ *C08L 67/03* (2013.01); *C08K 3/2279* (2013.01); *C08L 23/00* (2013.01); *C08L 67/02* (2013.01); *C08K 2003/2241* (2013.01); *C08L 2201/02* (2013.01); *C08L 2205/03* (2013.01)

(58) Field of Classification Search
CPC .......... C08K 3/2279; C08K 2003/2241; C08L 23/00; C08L 67/02; C08L 67/03; C08L 69/00
See application file for complete search history.

(56) References Cited

U.S. PATENT DOCUMENTS

| | | |
|---|---|---|
| 4,044,073 A | 8/1977 | Baron et al. |
| 4,966,935 A | 10/1990 | Takahashi |
| 2004/0054116 A1 | 3/2004 | Kanayama et al. |
| 2004/0176511 A1 | 9/2004 | Osamu et al. |
| 2009/0326110 A1 | 12/2009 | Tanaka et al. |
| 2011/0269882 A1 | 11/2011 | Kurokawa et al. |
| 2012/0190783 A1 | 7/2012 | Van Gisbergen et al. |

FOREIGN PATENT DOCUMENTS

| | | |
|---|---|---|
| CN | 102186910 A | 9/2011 |
| CN | 102341456 A | 2/2012 |
| DE | 26 22 414 A1 | 12/1976 |
| EP | 0 539 325 A1 | 4/1993 |
| EP | 1 529 810 A1 | 5/2005 |
| EP | 1614716 A1 | 1/2006 |
| JP | 51-143056 | 12/1976 |
| JP | 61-66746 | 4/1986 |
| JP | 5-156141 A | 6/1993 |
| JP | 5-222272 A | 8/1993 |
| JP | H06-009819 | 1/1994 |
| JP | 6-100713 | 4/1994 |
| JP | 7-196859 | 8/1995 |
| JP | 8-165358 A | 6/1996 |
| JP | H0912899 | 1/1997 |
| JP | 10-67925 | 3/1998 |
| JP | 10-158486 | 6/1998 |
| JP | 2000-178417 | 6/2000 |
| JP | 2000-212420 A | 8/2000 |
| JP | 2001254009 | 9/2001 |
| JP | 2002-536484 | 10/2002 |
| JP | 2004-263174 A | 9/2004 |

(Continued)

OTHER PUBLICATIONS

Combined Chinese Office Action and Search Report dated Sep. 23, 2016 in Patent Application No. 201480004598.X (with English translation of category of cited documents).
Wen Ping, et al., "New Foundry Technology Date Book" China Machine Press, 2012, pp. 739-740 (with cover page).
Office Action dated Jul. 5, 2016 in Japanese Patent Application No. 2013-002249.

(Continued)

*Primary Examiner* — Peter D. Mulcahy
(74) *Attorney, Agent, or Firm* — Oblon, McClelland, Maier & Neustadt, L.L.P.

(57) ABSTRACT

A polybutylene terephthalate resin composition is provided, which exhibits an excellent impact resistance, flame retardancy, heat aging resistance, lightfastness, and moist heat resistance and which also has an excellent moldability. Also provided is a molded article formed by molding this polybutylene terephthalate resin composition. The polybutylene terephthalate resin composition contains a polybutylene terephthalate resin (A) and a polycarbonate resin (B), and contains 50 to 80 mass parts (A) and 20 to 50 mass parts (B) per 100 mass parts of the total of (A) and (B), and additionally contains, per 100 mass parts of the total of (A) and (B), 5 to 20 mass parts of an elastomer (C), 5 to 40 mass parts of a flame retardant (D), and 1 to 15 mass parts of an antimony compound (E).

15 Claims, 2 Drawing Sheets

(56) References Cited

FOREIGN PATENT DOCUMENTS

| | | | |
|---|---|---|---|
| JP | 2005-112994 A | 4/2005 |
| JP | 2006-45544 A | 2/2006 |
| JP | 2006-56997 A | 3/2006 |
| JP | 2007-077208 A | 3/2007 |
| JP | 2007-314664 A | 12/2007 |
| JP | 2010-209352 A | 9/2010 |
| JP | 2011-84666 A | 4/2011 |
| JP | 2011-523973 A | 8/2011 |
| JP | 2011-231280 A | 11/2011 |
| JP | 2013-58269 A | 3/2013 |
| JP | 2014-001374 A | 1/2014 |
| WO | WO 2004/063263 A1 | 7/2004 |
| WO | WO 2010/046847 A1 | 4/2010 |
| WO | 2013/058269 A1 | 4/2013 |
| WO | 2013/058270 A1 | 4/2013 |

OTHER PUBLICATIONS

Extended European Search Report dated Jul. 14, 2016 in Patent Application No. 14737490.4.

Office Action dated Sep. 13, 2016 in Japanese Patent Application No. 2013-176567.

Combined Chinese Office Action and Search Report dated Feb. 14, 2016 in Patent Application No. 201480004598.X (with partial English language translation and English translation of category documents).

International Search Report dated Apr. 15, 2014 in PCT/JP2014/050212 filed Jan. 9, 2014.

Office Action as received in the corresponding Japanese Patent Application No. 2014-046113 dated May 23, 2017 w/English Translation.

Office Action dated Apr. 7, 2017 in Japanese Patent Application No. 2013-187039 with unedited computer generated English translation which is obtained through the Global Dossier.

Office Action as received in the corresponding Japanese Patent Application No. 2014-046113 dated Aug. 8, 2017 w/English Translation.

POLYBUTYLENE TEREPHTHALATE RESIN COMPOSITION AND MOLDED ARTICLE

TECHNICAL FIELD

The present invention relates to a polybutylene terephthalate resin composition and a molded article. The present invention more particularly relates to a polybutylene terephthalate resin composition that exhibits an excellent impact resistance, flame retardancy, heat aging resistance, lightfastness, and moist heat resistance and that also has an excellent moldability, and to a molded article formed by molding this polybutylene terephthalate resin composition.

BACKGROUND ART

Automobiles that incorporate an electric motor in their drive power source, such as electric automobiles and plug-in hybrid vehicles, have been gaining in popularity in recent years, and the installation of charging stands for charging the batteries in such automobiles is progressing. In addition, charger connectors for electric automobiles for battery charging, as well as holders for battery capacitors, have entered into use.

A high degree of flame retardancy is required of the housings that are a component of charger connectors for electric automobiles, battery capacitor holders, and charging stands for electric automobiles, and a thing made of metal is thus frequently used. In addition, efforts are also being made to convert this to plastics and a variety of resins are under investigation.

Among these resins, polybutylene terephthalate has favorable properties as an engineering plastic, e.g., an excellent heat resistance, moldability, chemical resistance, and electrical insulation performance, and as a consequence is used in, for example, electrical and electronic parts, automotive parts, other electrical parts, mechanical parts, and so forth. Investigations are underway to provide polybutylene terephthalate with flame retardancy.

As a general method for imparting flame retardancy to polybutylene terephthalate, a method for compounding a flame retardant using a halogen compound and antimony trioxide as a flame retardant synergist (refer to Patent Documents 1 and 5 to 8) are well known. Moreover, charger connectors for electric automobiles, battery capacitor holders, battery capacitor housings, and charging stands for electric automobile are—just as with other electrical and electronic parts—undergoing wall thinning and downsizing due to the trend toward smaller and lighter devices, and the moldings used in these applications are thus also undergoing downsizing and wall thinning. While a high degree of flame retardancy is required of these thin-walled moldings, it is increasingly difficult to achieve flame retardancy as the wall of a molding becomes thinner.

Moreover, in addition to flame retardancy, an excellent tracking resistance, which is one of electrical properties, is required in the electrical and electronic equipment field in order to ensure safety with respect to fire induced by electrical load.

With regard to materials that seek to provide an improved tracking resistance, Patent Document 9 discloses a resin composition that contains a thermoplastic polyester resin and an olefin copolymer formed of an α-olefin and the glycidyl ester of an α,β-unsaturated acid, and teaches that an ordinary flame retardant; a filler such as talc, kaolin, silica, and so forth; and a fibrous filler such as a glass fiber may be added on an optional basis. Patent Document 10 teaches a resin composition containing polybutylene terephthalate, brominated polycarbonate flame retardant, antimony flame retardant synergist, ethylene fluoride polymer, polyolefin, and a metal silicate filler and a glass fiber. Patent Document 11 discloses a resin composition containing a thermoplastic polyester resin, densified microfine talc powder, and a halogenated benzyl(meth)acrylate flame retardant, and teaches that a fibrous reinforcing agent may be added on an optional basis.

None of these resin compositions, however, were necessarily able to perform satisfactorily with regard to providing both flame retardancy and a high impact resistance.

In addition, due to its excellent crystalline characteristics, polybutylene terephthalate has the problem of having an unsatisfactory toughness, as represented by the impact strength, and in order to solve this problem research into polymer alloys has been underway for some time; various flame retardant formulations have also been introduced here.

For example, Patent Document 2 discloses a flame retardant polyester resin composition having the following as constituent components: polybutylene terephthalate resin, polycarbonate resin, halogen flame retardant, flame retardant synergist, and transesterification inhibitor. Patent Document 3 discloses a flame retardant polyester resin composition that contains a polybutylene terephthalate resin, polycarbonate resin, elastomer, flame retardant, and flame retardant synergist. In addition, Patent Document 4 discloses a polyester resin composition that contains a polyester resin, polystyrenic rubber, and flame retardant.

However, the properties required in the electrical and electronic equipment field have become increasingly stringent, and, in addition to flame retardancy and impact resistance, heat aging resistance, lightfastness, moist heat resistance, hydrolysis resistance, and a uniform and good quality appearance are also required, but it has been quite difficult for conventional formulations to respond here.

An excellent mold-releasability that avoids an increase in the releasing resistance force is also required in injection molding, and, for example, the following are strongly required: no generation of ejector pin marks during demolding, excellent surface appearance, and absence of warping.

Patent Document 1: Japanese Patent Application Laid-open No. S61-66746
Patent Document 2: Japanese Patent Application Laid-open No. 2007-314664
Patent Document 3: Japanese Patent Application Laid-open No. H6-100713
Patent Document 4: Japanese Patent Application Laid-open No. 2005-112994
Patent Document 5: Japanese Patent Application Laid-open No. 2004-263174
Patent Document 6: Japanese Patent Application Laid-open No. 2006-45544
Patent Document 7: Japanese Patent Application Laid-open No. 2006-56997
Patent Document 8: Japanese Patent Application Laid-open No. 2011-84666
Patent Document 9: Japanese Patent Application Laid-open No. H7-196859
Patent Document 10: Japanese Patent Application Laid-open No. H10-67925
Patent Document 11: Japanese Patent Application Laid-open No. H10-158486

SUMMARY OF INVENTION

Technical Problem

An object of the present invention is to provide a polybutylene terephthalate resin composition that exhibits an excellent impact resistance, flame retardancy, heat aging resistance, lightfastness, and moist heat resistance and that also has an excellent moldability. A further object of the present invention is to provide a molded article from this polybutylene terephthalate resin composition.

Solution to Problem

The present inventors discovered that a polybutylene terephthalate resin composition that exhibits an excellent impact resistance, flame retardancy, heat aging resistance, lightfastness, and moist heat resistance and that also has an excellent moldability, as well as molded articles therefrom, can be provided by compounding, at a particular amount for each, a polycarbonate resin, an impact resistance improver, a flame retardant, and an antimony compound in polybutylene terephthalate resin. The present invention was achieved based on this discovery.

That is, the present invention provides the following polybutylene terephthalate resin composition and molded articles.

[1] A polybutylene terephthalate resin composition containing a polybutylene terephthalate resin (A) and a polycarbonate resin (B) at 50 to 80 mass parts of (A) and 20 to 50 mass parts of (B) per 100 mass parts of the total of (A) and (B) and further containing, per 100 mass parts of the total of (A) and (B), 5 to 20 mass parts of an elastomer (C), 5 to 40 mass parts of a flame retardant (D), and 1 to 15 mass parts of an antimony compound (E).

[2] The polybutylene terephthalate resin composition according to [1] above, wherein the polycarbonate resin (B) has a viscosity-average molecular weight of more than 28,000.

[3] The polybutylene terephthalate resin composition according to [1] or [2] above, wherein the elastomer (C) is an acrylic core/shell graft copolymer.

[4] The polybutylene terephthalate resin composition according to any of [1] to [3] above, wherein the average particle diameter of the elastomer (C) is at least 300 nm.

[5] The polybutylene terephthalate resin composition according to any of [1] to [4] above, wherein the flame retardant (D) is a brominated polycarbonate flame retardant.

[6] The polybutylene terephthalate resin composition according to any of [1] to [5] above, wherein the antimony compound (E) is incorporated as a masterbatch with the polybutylene terephthalate resin (A).

[7] The polybutylene terephthalate resin composition according to any of [1] to [6] above, which further contains a titanium oxide (F) at 0.5 to 10 mass parts per 100 mass parts of the total of (A) and (B).

[8] The polybutylene terephthalate resin composition according to [7] above, wherein the titanium oxide (F) is a titanium oxide that has been subjected to a surface treatment with an alumina compound and an organosiloxane compound.

[9] The polybutylene terephthalate resin composition according to any of [1] to [8] above, which further contains a polyolefinic release agent (G) at 0.01 to 3 mass parts per 100 mass parts of the total of (A) and (B).

[10] The polybutylene terephthalate resin composition according to [9] above, wherein a drop point of the polyolefinic release agent (G) is not more than 100° C.

[11] The polybutylene terephthalate resin composition according to any of [1] to [10] above, which further contains 0.001 to 1 mass parts, per 100 mass parts of the total of (A) and (B), of a metal salt (H) of an organophosphate ester compound represented by any of the following general formulas (1) to (4):

[C1]

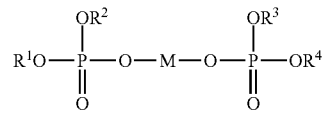
(1)

(in general formula (1), $R^1$ to $R^4$ are each independently an alkyl group having 1 to 30 carbons or an aryl group having 6 to 30 carbons and M is an alkaline-earth metal or zinc)

[C2]

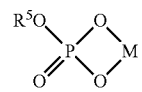
(2)

(in general formula (2), $R^5$ is an alkyl group having 1 to 30 carbons or an aryl group having 6 to 30 carbons and M is an alkaline-earth metal or zinc)

[C3]

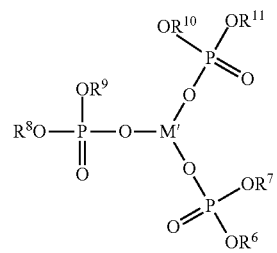
(3)

(in general formula (3), $R^6$ to $R^{11}$ are each independently an alkyl group having 1 to 30 carbons or an aryl group having 6 to 30 carbons and M' is a metal atom to form a trivalent metal ion)

[C4]

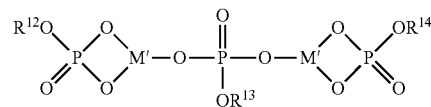
(4)

(in general formula (4), $R^{12}$ to $R^{14}$ are each independently an alkyl group having 1 to 30 carbons or an aryl group having 6 to 30 carbons; M' is a metal atom to form a trivalent metal ion; and two M' may be the same or may differ from one another).

[12] A molded article formed by molding the polybutylene terephthalate resin composition according to any of [1] to [11] above.

[13] The molded article according to [12] above, having a morphology in which in a core portion of the molded article, the polybutylene terephthalate resin (A) and the polycarbonate resin (B) form co-continuous phases and the elastomer (C) is present in the polycarbonate resin (B) phase.

[14] The molded article according to [12] or [13] above, wherein in a core portion of the molded article, at least 80% of the antimony compound (E) is present in the polybutylene terephthalate resin (A) phase.

[15] The molded article according to any of [12] to [14] above, wherein in a surface layer portion of the molded article, the elastomer (C) phase extends in a resin flow direction and a ratio between a long diameter and a short diameter (long diameter/short diameter) thereof is from 3 to 20.

[16] The molded article according to any of [12] to [15] above, wherein the flame retardant (D) is present in the polycarbonate resin (B) phase.

[17] The molded article according to any of [12] to [16] above, which is at least one selected from the group consisting of a charger connector for an electric automobile, a battery capacitor holder, a housing for a battery capacitor, or a housing for a charging stand for an electric automobile.

Advantageous Effect of Invention

The polybutylene terephthalate resin composition of the present invention is a resin material that exhibits an excellent impact resistance, flame retardancy, heat aging resistance, lightfastness, moist heat resistance, hydrolysis resistance, resistance to thermal discoloration, and mold-releasability, and that also has an excellent moldability and appearance, and is thus favorable for parts for various electrical and electronic equipment parts, electric automobile parts, and parts for household appliances such as cookware and in particular, for example, for charger connectors for electric automobiles, battery capacitor holders, battery capacitor housings, housings charging stands for electric automobile, housings for electrical and electronic equipment, connectors, relays, switches, sensors, actuators, terminal switches, parts for rice cookers, parts for grilling cookware, and so forth.

DESCRIPTION OF EMBODIMENTS

Figure 1:
FIG. 1 is an STEM photograph of a core portion of the molded article obtained in Example 41.

The contents of the present invention are described in detail in the following.

The individual constituent requirements described herebelow are described based on representative embodiments and specific examples of the present invention, but the present invention should not be construed as being limited to or by these embodiments and specific examples. In this Description, the numerical values provided before and after a "to" are included as the lower limit value and the upper limit value.

[Polybutylene Terephthalate Resin (A)]

The (A) polybutylene terephthalate resin (also abbreviated below as "PBT resin"), which is the major component making up the polybutylene terephthalate resin composition of the present invention, represents a polymer having a structure in which the terephthalic acid unit and the 1,4-butanediol unit are bonded in an ester linkage. Thus, this includes, in addition to polybutylene terephthalate resin (homopolymer), polybutylene terephthalate copolymers that contain a copolymer component other than the terephthalic acid unit and 1,4-butanediol unit and also includes mixtures of such copolymers with the homopolymer.

The PBT resin may contain a dicarboxylic acid unit other than terephthalic acid, and this additional dicarboxylic acid can be specifically exemplified by aromatic dicarboxylic acids such as isophthalic acid, ortho-phthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, bis(4,4'-carboxyphenyl)methane, anthracenedicarboxylic acid, and 4,4'-diphenyl ether dicarboxylic acid; alicyclic dicarboxylic acids such as 1,4-cyclohexanedicarboxylic acid and 4,4'-dicyclohexyldicarboxylic acid; and aliphatic dicarboxylic acids such as adipic acid, sebacic acid, azelaic acid, and dimer acids.

The diol unit may include a diol unit other than 1,4-butanediol, and this additional diol unit can be specifically exemplified by $C_{2-20}$ aliphatic and alicyclic diols and by bisphenol derivatives. Specific examples are ethylene glycol, propylene glycol, 1,5-pentanediol, 1,6-hexanediol, neopentyl glycol, decamethylene glycol, cyclohexanedimethanol, 4,4'-dicyclohexylhydroxymethane, 4,4'-dicyclohexylhydroxypropane, and bisphenol A/ethylene oxide adduct diols. In addition, triols, e.g., glycerol, trimethylolpropane, and so forth, may also be considered.

The PBT resin is preferably a polybutylene terephthalate homopolymer as provided by the polycondensation of terephthalic acid with 1,4-butanediol, but may also be a polybutylene terephthalate copolymer that contains as a carboxylic acid unit at least one species of dicarboxylic acid in addition to terephthalic acid and/or as a diol unit at least one species of diol in addition to 1,4-butanediol. Viewed from the perspective of the mechanical properties and heat resistance, the proportion of the terephthalic acid in the dicarboxylic acid units in the PBT resin is preferably at least 70 mol % and is more preferably at least 90 mol %. Similarly, the proportion of 1,4-butanediol in the diol units is preferably at least 70 mol % and is more preferably at least 90 mol %.

In addition to the difunctional monomers indicated above, the following may also be used in small amounts: trifunctional monomers in order to introduce a crosslinking structure, e.g., trimellitic acid, trimesic acid, pyromellitic acid, pentaerythritol, trimethylolpropane, and so forth; and monofunctional compounds, e.g., fatty acids, in order to adjust the molecular weight.

The PBT resin can be prepared by the melt polymerization, by a batch or continuous method, of a dicarboxylic acid component in which terephthalic acid is the major component, or an ester derivative thereof, with a diol component in which 1,4-butanediol is the major component. In addition, a low molecular weight polybutylene terephthalate resin may be produced by melt polymerization, after which the degree of polymerization (or molecular weight) can be raised to a desired value by solid-phase polymerization under a nitrogen current or under reduced pressure.

The PBT resin is preferably PBT resin obtained by a continuous melt polycondensation production method from a dicarboxylic acid component in which terephthalic acid is the major component and a diol component in which 1,4-butanediol is the major component.

The catalyst used to carry out the esterification reaction may be a heretofore known catalyst and can be exemplified by titanium compounds, tin compounds, magnesium compounds, and calcium compounds. Titanium compounds are particularly advantageous thereamong. Titanium compounds usable as esterification catalysts can be specifically exemplified by titanium alkoxides such as tetramethyl titanate, tetraisopropyl titanate, and tetrabutyl titanate and by titanium phenolates such as tetraphenyl titanate.

The PBT resin may be a polybutylene terephthalate resin that has been modified by copolymerization, and preferred copolymers in this regard can be specifically exemplified by polyesterether resins in which a polyalkylene glycol (particularly polytetramethylene glycol (PTMG)) has been copolymerized; polybutylene terephthalate resin in which dimer acid has been copolymerized; and in particular polybutylene terephthalate resin in which isophthalic acid has been copolymerized. These copolymers refer to copolymers in which the amount of copolymerization is from at least 1 mol % to less than 50 mol % with reference to the total PBT resin segments. The amount of copolymerization is preferably 2 to less than 50 mol %, more preferably 3 to 40 mol %, and particularly preferably 5 to 20 mol %.

The content of this copolymer, with reference to 100 mass % for the total amount of the polybutylene terephthalate resin (A), is preferably 10 to 100 mass %, more preferably 30 to 100 mass %, and particularly 50 to 100 mass %.

The intrinsic viscosity ([η]) of the PBT resin is preferably at least 0.9 dl/g. When a PBT resin having an intrinsic viscosity lower than 0.9 dl/g is used, the resulting resin composition is prone to have a low mechanical strength, e.g., impact resistance. In addition, the intrinsic viscosity is preferably not more than 1.8 dl/g, more preferably not more than 1.6 dl/g, and even more preferably not more than 1.3 dl/g. At greater than 1.8 dl/g, the fluidity of the resin composition may deteriorate and the moldability may then deteriorate. The intrinsic viscosity is the intrinsic viscosity measured at 30° C. in a 1:1 (mass ratio) mixed solvent of tetrachloroethane and phenol.

[Polycarbonate Resin (B)]

The polybutylene terephthalate resin composition of the present invention contains a polycarbonate resin (B).

The polycarbonate resin is a possibly branched thermoplastic polymer or copolymer obtained by the reaction, with phosgene or a carbonate diester, of a dihydroxy compound or this and a small amount of a polyhydroxy compound. The method of producing the polycarbonate resin is not particularly limited, and a polycarbonate resin can be used that has been produced by a heretofore known phosgene method (interfacial polymerization method) or melt method (transesterification method).

An aromatic dihydroxy compound is preferred for the starting dihydroxy compound and can be exemplified by 2,2-bis(4-hydroxyphenyl)propane (=bisphenol A), tetramethylbisphenol A, bis(4-hydroxyphenyl)-p-diisopropylbenzene, hydroquinone, resorcinol, 4,4-dihydroxydiphenyl, and so forth, wherein bisphenol A is preferred. A compound in which at least one tetraalkylphosphonium sulfonate is bonded to the aforementioned aromatic dihydroxy compound may also be used.

Among the preceding, the polycarbonate resin is preferably an aromatic polycarbonate resin derived from 2,2-bis(4-hydroxyphenyl)propane or an aromatic polycarbonate copolymer derived from 2,2-bis(4-hydroxyphenyl)propane and another aromatic dihydroxy compound. The polycarbonate resin may also be a copolymer in which the main constituent is an aromatic polycarbonate resin, e.g., a copolymer with a siloxane structure-containing polymer or oligomer. Moreover, a mixture of two or more of the hereinabove described polycarbonate resins may be used.

A monohydric aromatic hydroxy compound may be used to adjust the molecular weight of the polycarbonate resin, e.g., m-methylphenol, p-methylphenol, m-propylphenol, p-propylphenol, p-tert-butylphenol, and p-(long chain alkyl)-substituted phenol.

The viscosity-average molecular weight (Mv) of the polycarbonate resin is preferably at least 20,000, more preferably at least 23,000 or at least 25,000, and in particular is even more preferably greater than 28,000. When a polycarbonate resin having a viscosity-average molecular weight of less than 20,000 is used, the resulting resin composition is prone to have a low mechanical strength, e.g., impact resistance. Not more than 60,000 is preferred; not more than 40,000 is more preferred; and not more than 35,000 is even more preferred. At above 60,000, the fluidity of the resin composition may worsen and the moldability may then deteriorate.

In the present invention, the viscosity-average molecular weight (Mv) of the polycarbonate resin refers to the value calculated using Schnell's viscosity equation below, wherein the intrinsic viscosity ([η]) is determined by measuring the viscosity of a methylene chloride solution of the polycarbonate resin at 20° C. using a Ubbelohde viscometer.

$$[\eta]=1.23\times10^{-4}M_v^{0.83}$$

There are no particular limitations on the method of producing the polycarbonate resin, and polycarbonate resin produced by a phosgene method (interfacial polymerization method) or melt method (transesterification method) can be used. A preferred polycarbonate resin is also provided by subjecting a polycarbonate resin produced by a melt method to a post-treatment that adjusts the amount of terminal OH groups.

With regard to the content of the polycarbonate resin (B), and expressed per 100 mass parts of the total of the polybutylene terephthalate resin (A) and polycarbonate resin (B), the polycarbonate resin (B) is 20 to 50 mass parts and is preferably at least 25 mass parts and more preferably at least 30 mass parts and is preferably not more than 45 mass parts and more preferably not more than 40 mass parts. At below the indicated lower limit value, there is little improvement in the impact resistance and toughness of the polybutylene terephthalate resin composition of the present invention, and the dimensional stability declines as well. The fluidity worsens and hence the moldability deteriorates when the indicated upper limit value is exceeded.

[Elastomer (C)]

A thermoplastic elastomer that is used through its incorporation in a polyester resin or polycarbonate resin to improve the impact resistance thereof may be used as the elastomer (C) that is present in the polybutylene terephthalate resin composition of the present invention, and, for example, a rubbery polymer may be used or a copolymer provided by the copolymerization of a rubbery polymer with a compound reactive therewith may be used.

The elastomer (C) can be specifically exemplified by the following: polybutadiene, polyisoprene, diene copolymers (e.g., styrene-butadiene copolymers, acrylonitrile-butadiene copolymers, acrylic butadiene rubbers, and so forth), copolymers between ethylene and an α-olefin having at least 3 carbons (e.g., ethylene-propylene copolymers, ethylene-butene copolymers, ethylene-octene copolymers, and so forth), copolymers between ethylene and unsaturated carboxylic acid esters (e.g., ethylene-methacrylate copolymers, ethylene-butyl acrylate copolymers, and so forth), copolymers between ethylene and aliphatic vinyl compounds, ethylene-propylene-nonconjugated diene terpolymers, acrylic rubbers (e.g., polybutyl acrylate, poly(2-ethylhexyl acrylate), butyl acrylate-2-ethylhexyl acrylate copolymers, and so forth), and silicone rubbers (e.g., polyorganosiloxane rubbers and IPN composite rubbers of a polyorganosiloxane rubber and a polyalkyl(meth)acrylate rubber). A single one of these may be used or two or more may be used in combination.

In the present invention, (meth)acrylate denotes both acrylate and methacrylate, while (meth)acrylic acid denotes both acrylic acid and methacrylic acid.

Copolymers provided by the polymerization of a monomer compound into a rubbery polymer are another example of the elastomer (C). The monomer compound here can be exemplified by aromatic vinyl compounds, vinyl cyanide compounds, (meth)acrylate ester compounds, and (meth) acrylic acid compounds. Additional examples are epoxy group-containing (meth)acrylate ester compounds such as glycidyl(meth)acrylate; maleimide compounds such as maleimide, N-methylmaleimide, and N-phenylmaleimide; and α,β-unsaturated carboxylic acid compounds, e.g., maleic acid, phthalic acid, and itaconic acid, as well as their anhydrides (for example, maleic anhydride). A single one of these monomer compounds may be used or two or more may be used in combination.

The elastomer (C) is preferably an elastomer that contains an acrylic and/or butadiene component or is preferably an elastomer provided by the copolymerization into a butadiene-type and/or acrylic rubbery polymer of a monomer compound reactive therewith.

An impact resistance modifier that contains an acrylic and/or butadiene component can be specifically exemplified by acrylonitrile-butadiene copolymers, acrylic-butadiene rubbers, and copolymers provided by the polymerization of a monomer compound into these rubbery polymers. This monomer compound can be exemplified by aromatic vinyl compounds, vinyl cyanide compounds, (meth)acrylate ester compounds, and (meth)acrylic acid compounds. Additional examples are epoxy group-containing (meth)acrylate ester compounds such as glycidyl(meth)acrylate; maleimide compounds such as maleimide, N-methylmaleimide, and N-phenylmaleimide; and α,β-unsaturated carboxylic acid compounds, e.g., maleic acid, phthalic acid, and itaconic acid, as well as their anhydrides (for example, maleic anhydride). A single one of these monomer compounds may be used or two or more may be used in combination.

Viewed from the standpoint of improving the impact resistance, the elastomer containing an acrylic and/or butadiene component is preferably a core/shell graft copolymer type, and a particularly preferred core/shell graft copolymer is formed of a core layer of a butadiene component-containing rubber and/or an acrylic component-containing rubbery polymer and, surrounding this core layer, a shell layer formed by the copolymerization of monomer selected from acrylate esters, methacrylate esters, and aromatic vinyl compounds.

The following are examples of this core/shell graft copolymer: butyl acrylate-methyl methacrylate copolymers, butadiene-methyl methacrylate-styrene copolymers, silicone-acrylic methyl methacrylate copolymers, methyl methacrylate-butadiene-styrene polymers (MBS), methyl methacrylate-acrylonitrile-butadiene-styrene polymers (MABS), methyl methacrylate-butadiene polymers (MB), methyl methacrylate-acrylic butadiene rubber copolymers, and methyl methacrylate-acrylic butadiene rubber-styrene copolymers. A single one of these rubbery polymers may be used or two or more may be used in combination. Among the preceding, an acrylic core/shell elastomer in which both the core and shell are an acrylate ester is preferred from the standpoint of the impact resistance, heat aging resistance, and lightfastness.

The content of the acrylic and/or butadiene component in the elastomer containing an acrylic and/or butadiene component is preferably 50 to 95 mass %, more preferably 60 to 90 mass %, and even more preferably 70 to 85 mass %. The impact resistance tends to worsen when the content of the acrylic and/or butadiene component is less than 50 mass %, while the flame retardancy and weathering resistance assume a deteriorating trend at above 90 mass %, which is thus unfavorable.

The average particle diameter of the elastomer (C) is preferably not greater than 3 μm, more preferably not greater than 2 μm, even more preferably not greater than 1 μm, and particularly preferably not greater than 800 nm. The lower limit is generally 50 nm and is preferably 100 nm, more preferably 150 nm, even more preferably 200 nm, particularly preferably at least 300 nm, and most preferably at least 400 nm and in particular is at least 500 nm. The use of an elastomer (C) with such particle diameters tends to provide an excellent impact resistance, e.g., surface impact resistance, moist heat resistance, and moldability, e.g., mold-releasability, and is thus preferred.

The average particle diameter of the elastomer (C) can be measured by observation—using, for example, an optical microscope, scanning electron microscope (SEM), or transmission electron microscope (TEM)—of the morphology of the cross section of a molded article from the polybutylene terephthalate resin composition.

In specific terms, observation is carried out using an SEM, STEM, or TEM analyzer at an amplification of 3,000 to 100,000× at an acceleration voltage of 20 kV, on the core portion of a cross section of the molded article (the cross section parallel to the direction of resin composition flow, central part of the cross section, in the region excluding the surface layer having a depth of less than 20 μm).

The glass transition temperature of the elastomer (C) is preferably equal to or less than −30° C., more preferably equal to or less than −35° C., even more preferably equal to or less than −40° C., and particularly preferably equal to or less than −50° C. The use as a starting material of an elastomer (C) having such a glass transition temperature is preferred because this facilitates, in the surface layer portion of the molded article, an increase in the flattening (ratio between the long diameter and short diameter of the elastomer, vide infra) of the elastomer due to elastomer orientation and causes the impact resistance to assume a trend whereby it reaches superior levels.

The glass transition temperature of the elastomer (C) can be measured by determining the peak temperature for the loss tangent (tan δ) obtained in a dynamic viscoelastic measurement. In specific terms, the starting elastomer (C) is press molded for 3 minutes in a 0.7 mm thick×10 cm×10 cm mold using a hot press heated to 200° C.; after water cooling, a 0.7 mm thick×5.5 mm×25 mm measurement test specimen is cut out; a dynamic viscoelastic measurement is performed in the temperature range from 50 to −100° C. at a heating rate of 3° C./minute and a frequency of 110 Hz; and the peak temperature of the obtained tan δ is determined and taken to be the glass transition temperature.

An emulsion polymerization method may be used as the method for producing the acrylic core/shell elastomer preferred for use as the elastomer (C) of the present invention. This is a method that includes a core polymerization and a shell polymerization.

This core polymerization is carried out by polymerizing an acrylate ester monomer. Here, since a single double bond is present in the molecular structure of the acrylate ester, no double bond is then present after the completion of polymerization and an excellent weathering resistance is exhibited; the glass transition temperature is also low and as a consequence an excellent impact resistance is exhibited. In addition to the acrylate ester monomer, a crosslinking agent is used in a prescribed range in order to provide impact resistance through the formation of a rubber structure functioning as an elastomer and in order to control the glass transition temperature. The crosslinking agent incorporated in the prescribed range functions not only to maintain the stability of the latex during polymerization, but also functions so the core structure in the resin composition may readily deform during processing from a spherical shape to a flat state.

The shell polymerization is carried out by developing a graft polymerization at the core surface using as the monomer a methacrylate ester that generally exhibits an excellent compatibility with polyvinylchloride resins. The shell may contain a small amount of acrylonitrile monomer in order to increase the dispersibility of the elastomer.

The known methods for producing acrylic core/shell elastomers by emulsion polymerization may be roughly classified into two types of methods. The first method is disclosed in U.S. Pat. No. 5,612,413 and is a multistage emulsion polymerization method in which a seed having a small particle size is produced by polymerization; the seed is grown through the introduction of monomer divided into 2 to 4 steps; and the core/shell structure is subsequently completed by introducing the shell component monomer and surrounding the core surface. The second method is disclosed in EP 0527605 (A1) and is a microagglomeration method in which a latex having a core/shell structure with a size not greater than 100 nm is produced by polymerization; the particles are grown to a desired size through an agglomeration step; and a core/shell structure is then formed by forming an encapsulation shell on the agglomerated particles.

The glass transition temperature of the elastomer (C) increases with increasing crosslink density in the elastomer and declines with declining crosslink density in the rubber. Accordingly, the crosslink density level can be adjusted through the amount of crosslinking agent used during elastomer production, and an elastomer having a low glass transition temperature can be produced by using a very small amount of crosslinking agent. However, the addition of too little crosslinking agent is unfavorable because the stability of the latex during polymerization then declines and as a consequence control of the glass transition temperature can become quite problematic.

An acrylic core/shell elastomer preferred for the present invention is, for example, a large particle diameter elastomer having a particle diameter of 400 to 900 nm and produced by polymerization to generate a seed, growing up the core rubber particles by polymerization of the core component monomer divided into 2 to 4 steps, and subsequent introduction of the shell component monomer to surround the core surface.

For this, the individual cores in this large particle diameter elastomer preferably contain i) 95 to 99.999 mass parts acrylate ester in which the number of carbons in the alkyl group is 2 to 8 and ii) 0.001 to 5.0 mass parts crosslinking agent.

The acrylate ester here is preferably at least one monomer selected from the group consisting of methyl acrylate, ethyl acrylate, propyl acrylate, isopropyl acrylate, butyl acrylate, hexyl acrylate, octyl acrylate, and 2-ethylhexyl acrylate, and is more preferably acrylate ester that includes butyl acrylate, 2-ethylhexyl acrylate, or a mixture thereof.

The following are preferably used for the crosslinking agent: at least one monomer selected from the group consisting of 1,3-butanediol diacrylate, 1,3-dibutanediol dimethacrylate, 1,4-butanediol diacrylate, 1,4-butanediol dimethacrylate, allyl acrylate, allyl methacrylate, trimethylolpropane triacrylate, tetraethylene glycol diacrylate, tetraethylene glycol dimethacrylate, and divinyl benzene. It more preferably includes 1,3-butanediol diacrylate, 1,3-butanediol dimethacrylate, allyl acrylate, allyl methacrylate, or a mixture thereof. This crosslinking agent is preferably used at 0.001 to 5 mass parts with reference to the total monomer for the particular elastomer of the present invention. Handling during processing may be poor when the content of the crosslinking agent is less than 0.001 mass parts with respect to the total monomer, while at above 5 mass parts the core of the elastomer may exhibit brittleness and the impact-reinforcing effect may be reduced.

The shell of this large particle diameter elastomer i) may contain 80 to 100 mass parts of a methacrylate ester in which the number of carbons in the alkyl group is 1 to 4, wherein ii) ethyl acrylate, methyl acrylate, and/or butyl acrylate may be added in a proportion of not more than 10 mass parts in order to adjust the glass transition temperature of the shell component and iii) a nitrile compound such as acrylonitrile or methacrylonitrile may also be added in a proportion of not more than 10 mass parts in order to increase the compatibility between the matrix and the shell.

The core of an acrylic core/shell elastomer preferred for the present invention (a large particle diameter elastomer) preferably contains 70 to 95 mass % rubber component monomer with reference to the total monomer. At less than 70 mass %, there is a low rubber content and the impact resistance reinforcement then readily declines. At above 95 mass %, the shell component may be unable to completely enclose the core and as a consequence the dispersion of the rubber in the matrix may not proceed well and the impact resistance may be reduced.

After polymerization, the elastomer can be coagulated using an electrolyte and can then be obtained by filtration. Calcium chloride, for example, is preferred for this electrolyte.

A more detailed description follows for a process that produces an acrylic core/shell elastomer that has a low glass transition temperature and a large average particle diameter preferably of at least 400 nm and that is preferred for use in the present invention. This production method contains primarily the following steps.

This large particle diameter elastomer having a low glass transition temperature can be produced by a method that includes the following:

i) a primary polymerization step in which seeds are produced by carrying out a crosslinking reaction at a temperature of 60 to 80° C. in a mixture that contains 95 to 99.999 mass parts of an acrylate ester in which the number of carbons in the alkyl group is 2 to 8, 0.001 to 5 mass parts of a crosslinking agent, 0.001 to 5 mass parts of a polymerization initiator, 0.001 to 10 mass parts of an emulsifying agent, and 1,000 mass parts deionized water;

ii) a secondary polymerization step that produces a core rubber by carrying out a polymerization by continuously introducing, into the seeds produced in step i), an emulsion mixture containing 95 to 99.999 mass parts of an acrylate ester in which the number of carbons in the alkyl group is 2 to 8, 0.001 to 5 mass parts of a crosslinking agent, 0.001 to 6 mass parts of an emulsifying agent, and 80 mass parts deionized water, and at the same time introducing 0.001 to 5 mass parts of a polymerization initiator;

iii) a tertiary polymerization step that produces core rubber by carrying out a polymerization by continuously introducing, into the secondary polymerizate produced in step ii), an emulsion mixture containing 95 to 99.999 mass parts of an acrylate ester in which the number of carbons in the alkyl group is 2 to 8, 0.001 to 5 mass parts of a crosslinking agent, 0.001 to 6 mass parts of an emulsifying agent, and 80 mass parts deionized water, and at the same time introducing 0.001 to 5 mass parts of a polymerization initiator; and iv) a quaternary polymerization step in which the shell is formed by carrying out a polymerization by continuously introducing, to the core produced in the aforementioned stage iii), an emulsion mixture containing 80 to 100 mass parts of an acrylate ester in which the number of carbons in the alkyl group is 1 to 4, not more than 10 mass parts of an acrylate ester selected from the group consisting of ethyl acrylate, methyl acrylate, and butyl acrylate, not more than 10 mass parts of a nitrile component selected from the group consisting of acrylonitrile and methacrylonitrile, 0.001 to 4 mass parts of an emulsifying agent, and 150 mass parts deionized water, and at the same time introducing 0.001 to 5 mass parts of a polymerization initiator.

Any compound that can cause a crosslinking reaction can be used as the polymerization initiator used in the above-described production of the large particle diameter elastomer, and in specific terms ammonium persulfate, potassium persulfate, benzoyl peroxide, azobisbutyronitrile, butyl hydroperoxide, cumene hydroperoxide, and so forth can be used.

For example, nonionic emulsifying agents and ionic emulsifying agents, e.g., the potassium salts of unsaturated fatty acids, potassium oleate, sodium lauryl sulfate, sodium dodecylbenzene sulfate, and so forth, can be used for the emulsifying agent that is used in the above-described production of the large particle diameter elastomer.

The polymer particles are coagulated by lowering the solids fraction content to 10 mass % by introducing deionized water into the thusly produced large particle diameter elastomer and subsequently introducing into the mixture a 10 mass % calcium chloride solution. The coagulated slurry is heated to 90° C., aged, and cooled. This is followed by washing the cooled slurry with deionized water and filtration to obtain an acrylic core/shell elastomer that is preferably used in the present invention.

The content of the elastomer (C) is 5 to 20 mass parts per 100 mass parts of the total of the polybutylene terephthalate resin (A) and polycarbonate resin (B). There is little improvement in the impact resistance at an elastomer (C) content of less than 5 mass parts, while the heat aging resistance and rigidity as well as the fluidity and flame retardancy decline at greater than 20 mass parts. A preferred content for the elastomer (C) is at least 7 mass parts and not more than 16 mass parts and more preferably not more than 13 mass parts.

[Flame Retardant (D)]

The polybutylene terephthalate resin composition of the present invention contains a flame retardant (D).

Flame retardants already known for use with plastics can be used as this flame retardant (D), specifically halogen-based flame retardants, phosphorus-based flame retardants (for example, melamine polyphosphate), nitrogen-based flame retardants (for example, melamine cyanurate), and metal hydroxides (for example, magnesium hydroxide).

The halogen-based flame retardants are more preferably bromine-based flame retardants.

Bromine-Based Flame Retardants

Any heretofore known bromine-based flame retardant used in thermoplastic resins can be used as the bromine-based flame retardant. Such bromine-based flame retardants can be exemplified by aromatic compounds and can be specifically exemplified by poly(brominated benzyl(meth)acrylate)s such as pentabromobenzyl polyacrylate; polybromophenylene ethers; brominated polystyrenes; brominated epoxy compounds such as epoxy oligomers of tetrabromobisphenol A; brominated imide compounds such as N,N'-ethylenebis(tetrabromophthalimide); and brominated polycarbonates.

Among the preceding, and viewed from the standpoint of obtaining an excellent thermal stability, poly(brominated benzyl(meth)acrylate)s such as pentabromobenzyl polyacrylate, brominated epoxy compounds such as epoxy oligomers of tetrabromobisphenol A, brominated polystyrenes, and brominated polycarbonates are preferred, while brominated polycarbonates and brominated polystyrenes are more preferred and brominated polycarbonates are particularly preferred from the standpoint of the impact resistance and flame retardancy.

The poly(brominated benzyl(meth)acrylate) is preferably a polymer obtained by the polymerization of a single bromine atom-containing benzyl(meth)acrylate, or by the copolymerization of two or more bromine atom-containing benzyl(meth)acrylates, or by the copolymerization of a bromine atom-containing benzyl(meth)acrylate with another vinyl monomer. The bromine atom is preferably added to the benzene ring and preferably 1 to 5 and more preferably 4 to 5 are added per benzene ring.

The bromine atom-containing benzyl acrylate can be exemplified by pentabromobenzyl acrylate, tetrabromobenzyl acrylate, tribromobenzyl acrylate, and mixtures of the preceding. The bromine atom-containing benzyl methacrylate can be exemplified by the methacrylates that correspond to the aforementioned acrylates.

The other vinyl monomer used for copolymerization with the bromine atom-containing benzyl(meth)acrylate can be specifically exemplified by acrylic acid; acrylate esters such as methyl acrylate, ethyl acrylate, butyl acrylate, and benzyl acrylate; methacrylic acid; methacrylate esters such methyl methacrylate, ethyl methacrylate, butyl methacrylate, and benzyl methacrylate; styrene; acrylonitrile; unsaturated carboxylic acids such as fumaric acid and maleic acid, and their anhydrides; vinyl acetate; and vinyl chloride.

These are generally used at not more than an equimolar amount with reference to the bromine atom-containing benzyl(meth)acrylate and within this range are preferably used in an amount that is not more than 0.5-fold on a molar basis relative to the bromine atom-containing benzyl(meth)acrylate.

In addition, for example, xylene diacrylate, xylene dimethacrylate, tetrabromoxylene diacrylate, tetrabromoxylene dimethacrylate, butadiene, isoprene, and divinylbenzene may also be used as the vinyl monomer, and these can generally be used at not more than 0.5-fold on a molar basis with reference to the bromine atom-containing benzyl acrylate or benzyl methacrylate.

This poly(brominated benzyl(meth)acrylate) is preferably pentabromobenzyl polyacrylate for its high bromine content and its high electric insulating properties (tracking resistance performance).

The brominated epoxy compounds can be specifically exemplified by bisphenol A-type brominated epoxy compounds as typified by tetrabromobisphenol A epoxy compounds.

There are no limitations on the molecular weight of the brominated epoxy compound, and this molecular weight may be determined by selection as appropriate; however, the mass-average molecular weight (Mw) is preferably 3,000 to 100,000, higher molecular weights are preferred and specifically Mw is more preferably 15,000 to 80,000, 18,000 to 78,000 (Mw) is particularly preferred, 20,000 to 75,000 (Mw) is further more preferred, and 22,000 to 70,000 is most preferable. Higher molecular weights are preferred within these ranges.

The brominated epoxy compound preferably has an epoxy equivalent weight of 3,000 to 40,000 g/eq, and 4,000 to 35,000 g/eq is more preferred and 10,000 to 30,000 g/eq is particularly preferred.

A brominated epoxy oligomer may also be co-used as a brominated epoxy compound-type flame retardant. In such a case, for example, the flame retardancy, mold-releasability, and fluidity can be subjected to suitable adjustments by using about 0 to 50 mass % of an oligomer with an Mw of not more than 5,000. The bromine atom content of the brominated epoxy compound may be freely selected, but, viewed from the standpoint of providing a satisfactory flame retardancy, is generally at least 10 mass % and at least 20 mass % is preferred and at least 30 mass % is particularly preferred, while the upper limit is 60 mass % and is especially preferably not more than 55 mass %.

The brominated polycarbonate flame retardant is specifically, for example, preferably a brominated polycarbonate obtained from a brominated bisphenol A and particularly tetrabromobisphenol A. Its terminal structure can be exemplified by the phenyl group, 4-t-butylphenyl group, and 2,4,6-tribromophenyl group, and a brominated polycarbonate flame retardant having the 2,4,6-tribromophenyl group for its terminal group structure is particularly preferred.

The average number of carbonate repeat units in the brominated polycarbonate flame retardant may be determined through selection as appropriate, but is generally 2 to 30. When the average number of carbonate repeat units is low, this may cause a reduction in the molecular weight of the polybutylene terephthalate resin (A) during melting. Conversely, when too large, the melt viscosity of the polycarbonate resin (B) may become high, causing a poor dispersion within the molded article and impairing the appearance of the molded article and particularly its glossiness. The average number of repeat units is thus preferably 3 to 15 and particularly preferably 3 to 10.

There are no limitations on the molecular weight of the brominated polycarbonate flame retardant, and this molecular weight may be determined by selection as appropriate; however, the viscosity-average molecular weight is preferably 1,000 to 20,000 and 2,000 to 10,000 is particularly preferred. The viscosity-average molecular weight of the brominated polycarbonate flame retardant can be determined by the same method as for the measurement of the viscosity-average molecular weight of the polycarbonate resin (B).

The aforementioned brominated polycarbonate flame retardant obtained from a brominated bisphenol A can be obtained by the usual method in which phosgene is reacted with a brominated bisphenol. A terminal blocking agent can be exemplified by aromatic monohydroxy compounds, and these may be substituted by halogen or an organic group.

The content of the flame retardant (D), expressed per 100 mass parts of the total of the polybutylene terephthalate resin (A) and polycarbonate resin (B), is 5 to 40 mass parts, preferably at least 7 mass parts and more preferably at least 10 mass parts and preferably not more than 30 mass parts, more preferably not more than 25 mass parts, and even more preferably not more than 20 mass parts. The polybutylene terephthalate resin composition of the present invention will have an unsatisfactory flame retardancy when too little of the flame retardant (D) is incorporated, while, conversely, the incorporation of too much produces the problems of a reduction in mechanical properties, a reduction in the mold-releasability, and bleed out of the flame retardant.

[Antimony Compound (E)]

The polybutylene terephthalate resin composition of the present invention contains an antimony compound (E).

Antimony trioxide ($Sb_2O_3$), antimony pentoxide ($Sb_2O_5$), and sodium antimonate are preferred examples of this antimony compound. Among these, antimony trioxide is preferred from the standpoint of the impact resistance.

When a bromine-based flame retardant is used as the flame retardant, the mass concentration in the resin composition of the bromine atoms originating with the bromine-based flame retardant and the antimony atoms originating with the antimony compound (E) is preferably 3 to 25 mass % for the total of both and is more preferably 4 to 22 mass % and even more preferably 10 to 20 mass %. The flame retardancy assumes a declining trend at less than 3 mass %, while the mechanical strength assumes a declining trend at greater than 20 mass %. In addition, the mass ratio between the bromine atoms and antimony atoms (Br/Sb) is preferably 0.3 to 5 and is more preferably 0.3 to 4. Flame retardancy is more easily generated by using such ranges, which are thus preferred.

The content of the antimony compound (E), expressed per 100 mass parts of the total of the polybutylene terephthalate resin (A) and polycarbonate resin (B), is 1 to 15 mass parts and is preferably at least 2 mass parts and more preferably at least 3 mass parts and is preferably not more than 10 mass parts, more preferably not more than 7 mass parts, even more preferably not more than 6 mass parts, and particularly preferably not more than 5 mass parts. The flame retardancy declines at below the indicated lower limit value. At above the indicated upper limit value, the crystallization temperature is lowered and the mold-releasability deteriorates, and/or the mechanical properties, e.g., the impact resistance, decline.

[Titanium Oxide (F)]

The polybutylene terephthalate resin composition of the present invention preferably contains a titanium oxide (F). Through the incorporation of titanium oxide in combination with the polybutylene terephthalate resin (A), polycarbonate resin (B), elastomer (C), flame retardant (D), and antimony compound (E) at the prescribed amounts for each, the crystallization of the polybutylene terephthalate resin (A) is delayed to a suitable degree and an even higher impact resistance can be achieved; the flame retardancy is also further improved. Moreover, when carbon black is incorporated with the goal, for example, of imparting color to the resin composition, defects in the appearance may be produced—due, inter alia, to carbon black aggregation—at molding weld regions and at stepped regions in the molding. However, it was found that these appearance defects are readily further ameliorated by the incorporation of titanium oxide (F). This is an effect that is uniquely identified for a resin composition that specifically contains the elastomer (C), flame retardant (D), and antimony compound (E) in a mixed resin of the polybutylene terephthalate resin (A) and polycarbonate resin (B).

There are no particular limitations on the method of production, the crystalline form, the average particle diameter, and so forth, of the titanium oxide that is used for the titanium oxide (F). Titanium oxide can be produced by a sulfuric acid method and a chlorine method; however, since a composition that incorporates titanium oxide produced by the sulfuric acid method tends to have an inferior whiteness, titanium oxide produced by the chlorine method is favorable for effectively achieving the objects of the present invention.

Titanium oxide may have a rutile or anatase crystalline form, but titanium oxide with the rutile crystalline form is favorable from the standpoint of the lightfastness. The average particle diameter of the titanium oxide (F) is preferably 0.01 to 3 µm, more preferably 0.05 to 1 µm, even more preferably 0.1 to 0.7 µm, and particularly preferably 0.1 to 0.4 µm. The workability during preparation of the resin composition is inferior when the average particle diameter is less than 0.01 µm; when it exceeds 3 µm, a rough skin is readily produced on the molding surface and/or the mechanical strength of the molding readily declines. A mixture of two or more titanium oxides having different average particle diameters may be used.

The titanium oxide (F) is preferably subjected to a surface treatment with an organosiloxane-type surface treatment agent, and this is preferably preceded by a pretreatment with an alumina-type surface treatment agent. Alumina hydrate is favorably used as the alumina-type surface treatment agent. The pretreatment may also be carried out using a silicic acid hydrate along with the alumina hydrate. There are no particular limitations on the pretreatment method, and the pretreatment may be carried out by any method. The pretreatment with alumina hydrate and optionally silicic acid hydrate is preferably carried out in the range of 1 to 15 mass % with reference to the titanium oxide.

The surface of the titanium oxide pretreated with alumina hydrate and optionally silicic acid hydrate is preferably additionally subjected to a surface treatment with an organosiloxane-type surface treatment agent because this can substantially improve the thermal stability and in addition, through a suitable suppression of the activity of the titanium oxide, tends to facilitate an inhibition of the decline in mechanical characteristics, e.g., impact resistance, and to readily inhibit a reduction in the hydrolysis resistance, due to a reduction in the molecular weight of the polycarbonate resin (B).

The organosiloxane-type surface treatment agent is preferably a reactive functional group-containing organosilicone compound that has a reactive functional group that reacts with the surface of inorganic compound particles. This reactive functional group can be exemplified by the Si—H group, Si—CH$_3$ group, Si—OH group, Si—NH group, and Si—OR group, wherein an organosilicone compound bearing the Si—H group, Si—OH group, or Si—OR group is more preferred and an organosilicone compound bearing the Si—H group or Si—CH$_3$ group is particularly preferred.

The organosilicone compound bearing the Si—H group or Si—CH$_3$ group should be a compound that has the Si—H group or Si—CH$_3$ group in the molecule, but is not otherwise particularly limited and should be selected as appropriate for use. Polyorganosiloxanes are preferred especially, e.g., poly(methylhydrogensiloxane), poly(dimethylsiloxane), polycyclo(methylhydrogensiloxane), poly(ethylhydrogensiloxane), poly(phenylhydrogensiloxane), poly[(methylhydrogensiloxane)(dimethylsiloxane)] copolymer, poly[(methylhydrogensiloxane)(ethylmethylsiloxane)] copolymer, poly[(methylhydrogensiloxane)(diethylsiloxane)] copolymer, poly[(methylhydrogensiloxane)(hexylmethylsiloxane)] copolymer, poly[(methylhydrogensiloxane)(octylmethylsiloxane)] copolymer, poly[(methylhydrogensiloxane)(phenylmethylsiloxane)] copolymer, poly[(methylhydrogensiloxane)(diethoxysiloxane)] copolymer, poly[(methylhydrogensiloxane)(dimethoxysiloxane)] copolymer, poly[(methylhydrogensiloxane)(3,3,3-trifluoropropylmethylsiloxane)] copolymer, poly[(dihydrogensiloxane)((2-methoxyethoxy)methylsiloxane)] copolymer, and poly[(dihydrogensiloxane)(phenoxymethylsiloxane)] copolymer.

Methods for treating the surface of the titanium oxide with an organosiloxane-type surface treatment agent include (1) dry methods and (2) wet methods. Wet methods are methods in which the titanium oxide, already pretreated with alumina hydrate and optionally also silicic acid hydrate, is added to a mixture of a solvent and the organosiloxane-type surface treatment agent; stirring is carried out followed by removal of the solvent; and a heat treatment is subsequently performed at 100 to 300° C. Dry methods can be exemplified by methods in which titanium oxide, already pretreated as above, is mixed with a polyorganohydrogensiloxane using, for example, a Henschel mixer, and methods in which an organic solution of a polyorganohydrogensiloxane is applied by spraying onto the pretreated titanium oxide and a heat treatment is carried out at 100 to 300° C.

The amount of treatment with the siloxane compound is generally 0.01 to 10 mass parts per 100 mass parts of the titanium oxide (F). When the amount of treatment is less than the indicated lower limit value, there is little effect from the surface treatment and the impact resistance, flame retardancy, and hydrolysis resistance of the polybutylene terephthalate resin composition of the present invention will readily decline. In addition, when the treatment amount exceeds the indicated upper limit value, the fluidity of the polybutylene terephthalate resin composition readily declines, making this unfavorable.

Viewed from these standpoints, the treatment amount, per 100 mass parts of the titanium oxide (F), is more preferably 0.1 to 6 mass parts, more preferably 0.5 to 5 mass parts, and particularly preferably 1 to 4 mass parts.

The content of the titanium oxide (F), expressed per 100 mass parts of the total of the polybutylene terephthalate resin (A) and polycarbonate resin (B), is preferably 0.5 to 10 mass parts and is more preferably at least 0.7 mass parts and even more preferably at least 1 mass parts and is more preferably not more than 8 mass parts, even more preferably not more than 6 mass parts, and particularly preferably not more than 5 mass parts. A satisfactory improvement in the impact resistance, flame retardancy, and hydrolysis resistance may not be obtained when the content of the titanium oxide (F) is less than 0.05 mass parts, while the mechanical properties and moldability may decline at above 10 mass parts.

[Polyolefinic Mold Release Agent (G)]

The polybutylene terephthalate resin composition of the present invention preferably contains a polyolefinic mold release agent (G). While the release agents heretofore known for use generally in polybutylene terephthalate resins can be used as a mold release agent, a polyolefinic mold release agent is incorporated in the present invention based on a consideration of the impact resistance, hydrolysis resistance, and mold-releasability.

Compounds selected from paraffin waxes and polyethylene waxes are preferred examples of the polyolefin compound, among which polyethylene waxes having a mass-average molecular weight of 700 to 10,000 and particularly 900 to 8,000 are preferred for the excellent dispersion of the polyolefin compound thereby provided.

The polyolefin compound in the present invention is preferably a polyolefin compound that does not bear a functional group compatible with polybutylene terephthalate resin, but a polyolefin compound that does bear a functional group compatible with polybutylene terephthalate resin, e.g., the carboxyl group (here and below, this denotes the carboxylic acid (anhydride) group, i.e., the carboxylic acid group and/or the carboxylic acid anhydride group), haloformyl group, ester group, metal carboxylate group, hydroxyl group, alkoxyl group, epoxy group, amino group, amide group, and so forth, can also be used. Its concentration, as the acid value of the polyolefin compound, is preferably more than 5 mg KOH/g and less than 50 mg KOH/g, and 10 to 40 mg KOH/g is more preferred, 15 to 30 mg KOH/g is further more preferred, and 20 to 28 mg KOH/g is particularly preferred.

An oxidized polyethylene wax can also be used as the polyolefin compound for its low volatile fraction and for the substantial improvement in the mold-releasability thereby provided at the same time.

The acid value can be measured by a potentiometric titration method (ASTM D 1386) using a 0.5 mol ethanolic KOH solution.

The polyolefinic mold release agent (G) has a drop point preferably of not more than 100° C. and more preferably not more than 90° C. The lower limit here is generally 50° C. and preferably 60° C. A drop point of less than 50° C. is disadvantageous because the release agent will then readily bleed out during the preliminary drying carried out prior to injection molding into the product molding and the pellets may then melt-bond to each other. The releasing action readily declines when the drop point exceeds 100° C., which is thus unfavorable.

The drop point can be measured by the method according to ASTM D 127. In specific terms, using a metal nipple, the temperature is measured at which the melted wax undergoes the earliest dripping from the metal nipple. In those instances where it is difficult to measure the drop point of the polyolefinic mold release agent, the melting point provided by differential scanning calorimetry (DSC) can be used as the drop point for the present invention.

A preferred content for the polyolefinic mold release agent (G) is 0.01 to 3 mass parts per 100 mass parts of the total of the polybutylene terephthalate resin (A) and polycarbonate resin (B). A decline in the surface appearance due to mold-release defects during melt molding occurs at less than 0.01 mass parts. At above 3 mass parts, on the other hand, the workability during kneading of the resin composition may decline and in addition gas may be readily produced during molding and cloudiness at the molding surface and/or gas scorching at the resin flow terminal regions may then be seen. The content of the mold release agent is more preferably at least 0.07 mass parts and even more preferably at least 0.1 mass parts and is more preferably not more than 1.2 mass parts and even more preferably not more than 1.0 mass parts.

[Stabilizer]

The polybutylene terephthalate resin composition of the present invention preferably also contains a stabilizer in order to have an improved thermal stability and prevent deterioration in the color and mechanical strength. Phosphorus stabilizers and phenolic stabilizers are preferred for the stabilizer.

In particular, the incorporation of a phosphorus stabilizer can bring about a substantial improvement in the compatibility among the polybutylene terephthalate resin (A), polycarbonate resin (B), and flame retardant (D), and the stable molding of a molded article having the morphological structure described below is then facilitated.

The phosphorus stabilizer can be exemplified by phosphorous acid, phosphoric acid, phosphite esters, and phosphate esters, whereamong organophosphate ester compounds are preferred.

Organophosphate ester compounds have a substructure in which 1 to 3 alkoxy groups or aryloxy groups are bonded to a phosphorus atom. A substituent group may also be bonded to these alkoxy groups and aryloxy groups. A metal salt of the organophosphate ester compound is preferred, and the metal is more preferably at least one metal selected from Ia, IIa, IIb, and IIIa of the Periodic Table, among which magnesium, barium, calcium, zinc, and aluminum are more preferred and magnesium, calcium, and zinc are particularly preferred.

The use of an organophosphate ester compound represented by any of the following general formulas (1) to (5) is preferred for the present invention; the use of an organophosphate ester compound represented by any of the following general formulas. (1) to (4) is more preferred; and the use of an organophosphate ester compound represented by the following general formula (1) or (2) is even more preferred. A combination of two or more organophosphate ester compounds may also be used.

[C5]

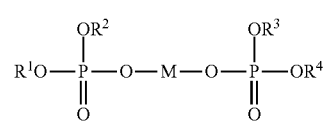

(1)

In general formula (1), $R^1$ to $R^4$ are each independently an alkyl group or an aryl group. M is an alkaline-earth metal or zinc.

[C6]

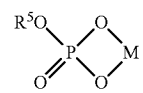

(2)

In general formula (2), $R^5$ is an alkyl group or an aryl group and M is an alkaline-earth metal or zinc.

[C7]

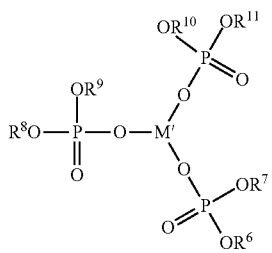

(3)

In general formula (3), $R^6$ to $R^{11}$ are each independently an alkyl group or an aryl group. M' is a metal atom to form a trivalent metal ion.

[C8]

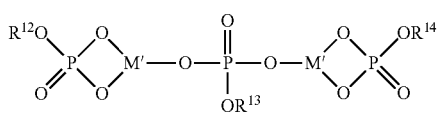

(4)

In general formula (4), $R^{12}$ to $R^{14}$ are each independently an alkyl group or an aryl group. M' is a metal atom to form a trivalent metal ion, and the two M' may be the same as each other or may differ from one another.

[C9]

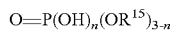

(5)

$$O=P(OH)_n(OR^{15})_{3-n}$$

In general formula (5), $R^{15}$ is an alkyl group or an aryl group. n is an integer from 0 to 2. When n is 0 or 1, two $R^{15}$ may be the same or may differ from one another.

$R^1$ to $R^{15}$ in general formulas (1) to (5) are generally alkyl groups having 1 to 30 carbons or aryl groups having 6 to 30 carbons. Alkyl groups having 2 to 25 carbons are preferred based on considerations of the resident thermal stability, chemical resistance, and moist heat resistance, and alkyl groups having 6 to 23 carbons are most preferred. The alkyl group can be exemplified by the octyl group, 2-ethylhexyl group, isooctyl group, nonyl group, isononyl group, decyl group, isodecyl group, dodecyl group, tridecyl group, isotridecyl group, tetradecyl group, hexadecyl group, and octadecyl group. The M in general formulas (1) and (2) is preferably zinc, and the M' in general formulas (3) and (4) is preferably aluminum.

Preferred specific examples of the organophosphate ester compound are zinc bis(distearyl acid phosphate) for compounds with general formula (1), zinc monostearyl acid phosphate for compounds with general formula (2), aluminum tris(distearyl acid phosphate) for compounds with general formula (3), the salt between one monostearyl acid phosphate and two aluminum monostearyl acid phosphates for compounds with general formula (4), and monostearyl acid phosphate and distearyl acid phosphate for compounds with general formula (5). More preferred among the preceding are zinc bis(distearyl acid phosphate) and zinc monostearyl acid phosphate.

A single one of these may be used or a mixture may be used.

The use of a zinc salt of a stearyl acid phosphate—e.g., zinc bis(distearyl acid phosphate), which is an organophosphate ester compound zinc salt represented by the preceding general formula (1), and zinc monostearyl acid phosphate, which is an organophosphate ester compound zinc salt represented by the preceding general formula (2)—is preferred because this provides a very high transesterification-inhibiting effect, a good thermal stability during the molding process, and an excellent moldability and makes it possible to establish a high set temperature in the metering section of an injection molder and carry out stable molding, and also provides an excellent hydrolysis resistance and an excellent impact resistance. A commercially available example here is "JP-518Zn" from Johoku Chemical Co., Ltd.

The content of the organophosphate ester compound is preferably 0.001 to 1 mass parts per 100 mass parts of the total of the polybutylene terephthalate resin (A) and polycarbonate resin (B). When the content is less than 0.001 mass parts, there is little possibility of obtaining an improvement in the thermal stability and compatibility of the resin composition and a reduction in molecular weight and a deterioration in the color are prone to occur during molding. At above 1 mass parts, an excess amount is present and silver streaks and color deterioration will tend to occur even more readily. The content of the organophosphate ester compound is more preferably 0.01 to 0.8 mass parts, even more preferably 0.05 to 0.7 mass parts, and particularly preferably 0.1 to 0.5 mass parts.

The phenolic stabilizer can be exemplified by pentaerythritol tetrakis(3-(3,5-di-t-butyl-4-hydroxyphenyl)propionate), octadecyl 3-(3,5-di-tert-butyl-4-hydroxyphenyl)propionate, thiodiethylenebis(3-(3,5-di-tert-butyl-4-hydroxyphenyl)propionate), and pentaerythritol tetrakis(3-(3,5-dineopentyl-4-hydroxyphenyl)propionate). Preferred thereamong are pentaerythritol tetrakis(3-(3,5-di-tert-butyl-4-hydroxyphenyl)propionate) and octadecyl 3-(3,5-di-tert-butyl-4-hydroxyphenyl)propionate.

The content of the phenolic stabilizer is preferably 0.001 to 1 mass parts per 100 mass parts of the total of the polybutylene terephthalate resin (A) and polycarbonate resin (B). When the content is less than 0.001 mass parts, there is little possibility of obtaining an improvement in the thermal stability and compatibility of the resin composition and a reduction in molecular weight and a deterioration in the color are prone to occur during molding. At above 1 mass parts, an excess amount is present and silver streaks and color deterioration will tend to occur even more readily. The content of the phenolic stabilizer is more preferably 0.001 to 0.7 mass parts and even more preferably 0.005 to 0.5 mass.

[Anti-Dripping Agent]

The polybutylene terephthalate resin composition of the present invention preferably contains an anti-dripping agent.

Fluoropolymers are preferred for the anti-dripping agent.

The known fluorine-containing polymers can be freely selected and used as the fluoropolymer, among which fluoroolefin resins are preferred.

The fluoroolefin resins can be exemplified by polymers and copolymers that contain the fluoroethylene structure. Specific examples here are difluoroethylene resins, tetrafluoroethylene resins, and tetrafluoroethylene/hexafluoropropylene copolymer resins. Tetrafluoroethylene resins are preferred among the preceding. This fluoroethylene resin is preferably a fluoroethylene resin having a fibril-forming capability.

Fluoroethylene resins with a fibril-forming capability can be exemplified by Teflon (registered trademark) 6J from Du Pont-Mitsui Fluorochemicals Co., Ltd., and Polyflon (registered trademark) F201L and Polyflon F103 from Daikin Industries, Ltd.

Water-based dispersions of fluoroethylene resins can be exemplified by Teflon (registered trademark) 30J from Du Pont-Mitsui Fluorochemicals Co., Ltd., and Fluon D-1 from Daikin Industries, Ltd., and TF1750 from Sumitomo 3M Ltd. can be exemplified as a product by suspension polymerization. A fluoroethylene polymer having a multilayer structure and provided by the polymerization of vinyl monomer may also be used as the fluoropolymer. A specific example of this is Metablen (registered trademark) A-3800 from Mitsubishi Rayon Co., Ltd.

The content of the anti-dripping agent, per 100 mass parts of the total of the polybutylene terephthalate resin (A) and polycarbonate resin (B), is preferably 0.05 to 1 mass parts, more preferably at least 0.1 mass parts, even more preferably at least 0.12 mass parts, and particularly preferably at least 0.15 mass parts, and more preferably not more than 0.6 mass parts, even more preferably not more than 0.45 mass parts, and particularly preferably not more than 0.35 mass parts. The flame retardancy of the resin composition may become unsatisfactory when the content of the anti-dripping agent is too low, while when too much is incorporated appearance defects and a reduced mechanical strength may be produced in moldings from the resin composition.

[Other Constituent Components]

The resin composition of the present invention may contain various other additives within a range in which the effects of the present invention are not impaired. These additives can be exemplified by ultraviolet absorbers, pigments, reinforcing fillers, nucleating agents, antistatic agents, antifogging agents, antiblocking agents, plasticizers, dispersing agents, and antiseptics.

<Ultraviolet Absorber>

The polybutylene terephthalate resin composition of the present invention preferably also contains an ultraviolet absorber in order to provide an improved lightfastness. In particular, the lightfastness is readily improved even further by combined used with the previously described phosphorus-based stabilizer and/or phenolic stabilizer.

The ultraviolet absorber can be exemplified by organic ultraviolet absorbers such as benzotriazole compounds, benzophenone compounds, salicylate compounds, cyanoacrylate compounds, triazine compounds, oxanilide compounds, malonate ester compounds, hindered amine compounds, and so forth. Among these, benzotriazole-type ultraviolet absorbers, triazine-type ultraviolet absorbers, and malonate ester-type ultraviolet absorbers are more preferred and benzotriazole-type ultraviolet absorbers are particularly preferred.

The benzotriazole-type ultraviolet absorbers can be specifically exemplified by 2-(2'-hydroxy-5'-methylphenyl)benzotriazole, 2-[2'-hydroxy-3',5'-bis(α,α-dimethylbenzyl)phenyl]benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amyl)benzotriazole, 2-(2'-hydroxy-5'-di-tert-octylphenyl)benzotriazole, and 2,2'-methylenebis[4-(1,1,3,3-tetramethylbutyl)-6-(2N-benzotriazol-2-yl)phenol], whereamong 2-(2'-hydroxy-5'-tert-octylphenyl)benzotriazole and 2,2'-methylenebis[4-(1,1,3,3-tetramethylbutyl)-6-(2N-benzotriazol-2-yl)phenol are preferred and 2-(2'-hydroxy-5'-tert-octylphenyl)benzotriazole is particularly preferred.

The triazine-type ultraviolet absorbers can be specifically exemplified by 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, and 2,4-diphenyl-6-(2-hydroxy-4-butoxyethoxyphenyl)-1,3,5-triazine.

The malonate ester-type ultraviolet absorbers can be specifically exemplified by 2-(alkylidene)malonate esters and particularly 2-(1-arylalkylidene)malonate esters.

The content of the ultraviolet absorber, expressed per 100 mass parts of the total of the polybutylene terephthalate resin (A) and polycarbonate resin (B), is preferably at least 0.05 mass parts and more preferably at least 0.1 mass parts and is preferably not more than 1 mass parts, more preferably not more than 0.8 mass parts, and even more preferably not more than 0.6 mass parts. The improvement in the lightfastness may be unsatisfactory when the content of the ultraviolet absorber is less than the lower limit value for the indicated range, while mold deposits and so forth may be produced and mold staining may be caused when the content of the ultraviolet absorber exceeds the upper limit value for the indicated range.

<Pigment>

The resin composition of the present invention also preferably contains a pigment because this has the effect of improving the lightfastness. The pigment can be exemplified by inorganic pigments, e.g., black pigments such as carbon black (e.g., acetylene black, lamp black, thermal black, furnace black, channel black, and Ketjen black), red pigments such as iron oxide red, orange pigments such as molybdenum orange, and white pigments such as titanium oxide, and by organic pigments (e.g., yellow pigments, orange pigments, red pigments, blue pigments, and green pigments). Among these, carbon black is preferred from the standpoint of the lightfastness improving effect.

The pigment content is preferably 0.05 to 5 mass parts per 100 mass parts of the total of the polybutylene terephthalate resin (A) and polycarbonate resin (B). The improvement in the lightfastness may not be satisfactory at less than 0.05 mass parts, while the mechanical properties may be reduced at more than 5 mass parts. The pigment content is preferably 0.05 to 4 mass parts and is more preferably 0.1 to 3 mass parts.

In particular, for the present invention, the incorporation of the titanium oxide (F) was found to more readily ameliorate the appearance defects, e.g., at molding weld regions and at stepped regions on the molding, due, inter alia, to carbon black aggregation, that are readily produced when carbon black is incorporated. This is an effect that is uniquely identified for a resin composition that contains the specified amounts of the elastomer (C), flame retardant (D), and antimony compound (E) in a mixed resin of the polybutylene terephthalate resin (A) and polycarbonate resin (B), and is a major effect.

<Reinforcing Filler>

The resin composition of the present invention may contain a reinforcing filler within a range in which the effects of the present invention are not impaired, but preferably does not contain a reinforcing filler in those instances where a high impact resistance is required. When a reinforcing filler is incorporated, it is preferably a reinforcing filler that, through its incorporation in the resin, has the effect of enhancing the mechanical properties of the resulting resin composition, and the inorganic fillers commonly used in plastics can be used here. The use of a fibrous filler, e.g., a glass fiber, carbon fiber, basalt fiber, wollastonite, potassium titanate fiber, and so forth, is preferred. Also usable are particulate or irregular-shaped fillers such as calcium carbonate, titanium oxide, feldspar minerals, clays, organic clays, and glass beads; plate-shaped fillers such as talc; and scale-shaped fillers such as glass flake, mica, and graphite. Among the preceding, the use of glass fibers is preferred based on a consideration of the mechanical strength, rigidity, and heat resistance.

When a filler such as talc is used as a nucleating agent with the goal of increasing the crystallization rate, it may be incorporated in an amount that is not more than 1 mass parts and preferably not more than 0.6 mass parts with reference to 100 mass parts of the total of the polybutylene terephthalate resin (A) and polycarbonate resin (B).

A reinforcing filler that has been subjected to a surface treatment with a surface treatment agent such as a coupling agent is more preferably used as the reinforcing filler. A glass fiber having a surface treatment agent bonded thereto is preferred for the excellent durability, moist heat resistance, hydrolysis resistance, and heat shock resistance thereby provided.

Any heretofore known surface treatment agent can be used as the surface treatment agent here, and preferred specific examples are silane coupling agents, e.g., aminosilanes, epoxysilanes, allylsilanes, and vinylsilanes.

An aminosilane surface treatment agent is preferred among the preceding, and preferred specific examples thereof are γ-aminopropyltriethoxysilane, γ-aminopropyltrimethoxysilane, and γ-(2-aminoethyl)aminopropyltrimethoxysilane.

Additional preferred examples of the surface treatment agent are epoxy resins such as novolac-type epoxy resins and bisphenol A-type epoxy resins. Novolac-type epoxy resins are preferred therebetween.

A single silane surface treatment agent or a plurality thereof may be used; a single epoxy resin or a plurality thereof may be used; or a silane surface treatment agent may be used in combination with an epoxy resin.

The content of the reinforcing filler is preferably 0 to 100 mass parts per 100 mass parts of the total of the polybutylene terephthalate resin (A) and polycarbonate resin (B). A reinforcing filler content of more than 100 mass parts is disadvantageous due to the decline in the fluidity. A more preferred content for the reinforcing filler is 5 to 90 mass parts and more preferably 15 to 80 mass parts and further more preferably 30 to 80 mass parts and particularly preferably 40 to 70 mass parts.

<Other Thermoplastic Resins>

The resin composition of the present invention may contain, within a range in which the effects of the present invention are not impaired, another thermoplastic resin in addition to the polybutylene terephthalate resin (A) and the polycarbonate resin (B). This additional thermoplastic resin can be specifically exemplified by polyethylene terephthalate, polyamide, polyphenylene oxide, polystyrenic resins, polyphenylene sulfide, polysulfone, polyethersulfone, polyetherimide, and polyetherketone.

[Methods of Producing the Resin Composition]

The resin composition of the present invention can be produced according to ordinary methods for producing resin compositions. As a general matter, the individual components and the additives that are added as desired are thoroughly mixed together followed by melt kneading with a single-screw or twin-screw extruder. In addition, the resin composition of the present invention may also be prepared by feeding the individual components to an extruder using a feeder, without premixing thereof or with premixing of only a portion thereof, and carrying out melt kneading. Moreover, a masterbatch may be prepared by melt kneading a blend of a portion of the other components with a portion of the polybutylene terephthalate resin (A) or polycarbonate resin (B) and then blending the remaining other components into this and melt kneading.

When a fibrous reinforcing filler such as glass fiber is used, this is also preferably fed from a side feeder along the course of the extruder cylinder.

In particular, based on considerations of the variability in the impact resistance and flame retardancy and the thermal stability during melt kneading, the molding process, and so forth, the antimony compound (E) is preferably incorporated in the form of a masterbatch with a thermoplastic resin and particularly preferably with the polybutylene terephthalate resin (A). The masterbatching method is not particularly limited and can be exemplified by methods in which the antimony compound is melt kneaded with a thermoplastic resin.

The melt kneading method can be exemplified by methods that use a known kneader, e.g., a continuous kneader such as a single-screw or twin-screw extruder-type kneader, kneading roll, or calendar roll and so forth, or a pressure kneader or Banbury mixer. The use of a twin-screw extruder is preferred among the preceding.

The thermoplastic resin is also preferably dried prior to melt kneading. Convection drying is preferred for the drying, wherein the temperature thereof is preferably 100 to 140° C. and more preferably 110 to 130° C. and the drying time is preferably 1 to 5 hours and more preferably 2 to 4 hours.

When an extruder is used, the antimony compound and thermoplastic resin (preferably polybutylene terephthalate resin) are fed to the extruder and melt kneaded, and the resin composition is then extruded from a die nozzle into a strand form followed by cooling and cutting to produce pellets of the masterbatch.

A twin-screw extruder is preferably used as the melt kneading device in this process. Here, L/D, which is the ratio between the screw length L (mm) and the diameter D (mm) of the same screw, preferably satisfies the relationship 10<(L/D)<100 and more preferably satisfies 15<(L/D)<70. It is difficult to achieve a microdispersion between the antimony compound and the thermoplastic resin when this ratio is 10 or less, while decomposition of the thermoplastic resin readily occurs at above 100, which is thus disfavored.

With regard to the melt kneading conditions, the temperature is preferably 140 to 320° C. and more preferably 160 to 310° C. for the barrel temperature. At a melting temperature below 140° C., melting is inadequate and unmelted gel and antimony compound aggregation are readily produced to a substantial degree. Conversely, above 320° C. is unfavorable because the resin composition undergoes thermal deterioration and discoloration readily occurs.

The screw rotation rate during melt kneading is preferably 100 to 1,000 rpm and more preferably 120 to 800 rpm. When the screw rotation rate is less than 100 rpm, it tends to be difficult to bring about a microdispersion of the antimony compound. Conversely, above 1,000 rpm is unfavorable because the thermoplastic resin then tends to easily undergo degradation. The extrusion rate is preferably 5 to 2,000 kg/hr and is more preferably 10 to 1,500 kg/hr. At an extrusion rate below 5 kg/hr, the strand is unstable and the yield assumes a declining trend. Above 2,000 kg/hr is unfavorable because the antimony compound is then prone to undergo aggregation and the dispersibility assumes a declining trend.

With regard to the proportions for the starting thermoplastic resin (preferably polybutylene terephthalate resin) and antimony compound fed to melt kneading, the antimony compound proportion is preferably 20 to 90 mass % on the basis of 100 mass % for the total of the thermoplastic resin and antimony compound. When the antimony compound is less than 20 mass %, the antimony compound assumes a small proportion in the flame retardant masterbatch and there is then little improvement in the flame retardancy of the thermoplastic resin into which this is incorporated. When, on the other hand, the antimony compound exceeds 90 mass %, the dispersibility of the antimony compound then readily declines and the flame retardancy of the polybutylene terephthalate resin composition of the present invention will be unstable when such a masterbatch is incorporated in the polybutylene terephthalate resin (A). In addition, the workability during production of the flame retardant masterbatch also undergoes a substantial and unfavorable reduction; for example, during production using an extruder, the strand will not be stable and problems such as a susceptibility to breakage are readily produced.

The content of the antimony compound in the masterbatch, based on 100 mass % for the total of the thermoplastic resin and antimony compound, is preferably 30 to 85 mass % and is more preferably 40 to 80 mass %.

Various additives, e.g., a stabilizer and so forth, may also be incorporated on an optional basis during masterbatch preparation by melt kneading the thermoplastic resin with the antimony compound.

The antimony compound masterbatch is blended so as to provide an antimony compound content in the resulting polybutylene terephthalate resin composition, using 100 mass % for the overall polybutylene terephthalate resin composition, of preferably 0.5 to 10 mass %, more preferably 0.7 to 9 mass %, even more preferably 1 to 8 mass %, particularly 1.5 to 7 mass %, and most preferably 2 to 6 mass %.

When the antimony compound (E) is incorporated in the form of a masterbatch, preferably the polybutylene terephthalate resin (A), polycarbonate resin (B), elastomer (C), flame retardant (D), and other desired components are fed to the kneader, e.g., an extruder, in their respectively desired proportions, and the antimony compound masterbatch is at this time fed to the extruder from a dedicated feeder disposed separately from the other starting materials. The antimony compound masterbatch is preferably fed from an independent, dedicated feeder—without being mixed with components (A) to (D) and the other desired additives and fed from the same feeder—because this suppresses classification, provides an excellent flame retardancy and impact resistance, and provides a low variability.

When the antimony masterbatch is fed from a dedicated feeder, it may be fed at the same time as the other starting materials from the dedicated feeder into the extruder hopper or may be fed from along the course of the extruder. When fed from along the course of the extruder, it is preferably fed at the hopper side from the kneading zone.

The heating temperature for the polybutylene terephthalate resin (A), polycarbonate resin (B), elastomer (C), flame retardant (D), antimony compound (E), and other desired components during melt kneading can be selected as appropriate generally from the range of 220 to 300° C. When the temperature is too high, decomposition gas may be readily produced, which can cause opacification. The structure of the screw is therefore desirably selected considering, for example, the shear-generated heating. An antioxidant and/or a heat stabilizer is desirably used in order to inhibit degradation during kneading and during the ensuing molding step.

[Morphology of the Resin Composition Molded Article]

The molded article from the polybutylene terephthalate resin composition of the present invention preferably has a morphology in which in the core portion of the molded article the polybutylene terephthalate resin (A) and polycarbonate resin (B) form co-continuous phases and the elastomer (C) is present in the polycarbonate resin (B) phase. In addition, the antimony compound (E) is preferably also present in the polybutylene terephthalate resin (A) phase.

Here, the core portion refers to the central portion of the molded article cross section that is parallel to the direction of resin composition flow, that is the region of the molded article that excludes the surface layer region thereof having a depth of less than 20 µm. The surface layer portion refers to the cross section parallel to the direction of resin composition flow, that is the surface layer region extending into the interior to a depth of 20 µm from the surface of the molded article.

The "co-continuous phases" means that a phase formed of the polybutylene terephthalate resin (A) and a phase in which the polycarbonate resin (B) is in contact with itself both form continuous phases. By having such a co-continuous structure and by having a morphology in which the elastomer (C) is present in the polycarbonate resin (B) phase, moldings according to the present invention readily exhibit the characteristic feature of having both an excellent flame retardancy and an excellent impact resistance. There are no limitations on the structure, shape, or size of the co-continuous phases.

With regard to observation of the morphology of the polybutylene terephthalate resin composition molded article, measurements can be carried out by observation of the cross section of the molded article using, for example, an optical microscope, scanning electron microscope (SEM), or transmission electron microscope (TEM).

In specific terms, observation is carried out using an SEM, STEM, or TEM analyzer at an amplification of 3,000 to 100,000× at an acceleration voltage of 20 kV, on the core portion of the cross section of the molded article (the cross section parallel to the direction of resin composition flow, central part of the cross section, in the region excluding the surface layer having a depth of less than 20 µm).

Figure 2:
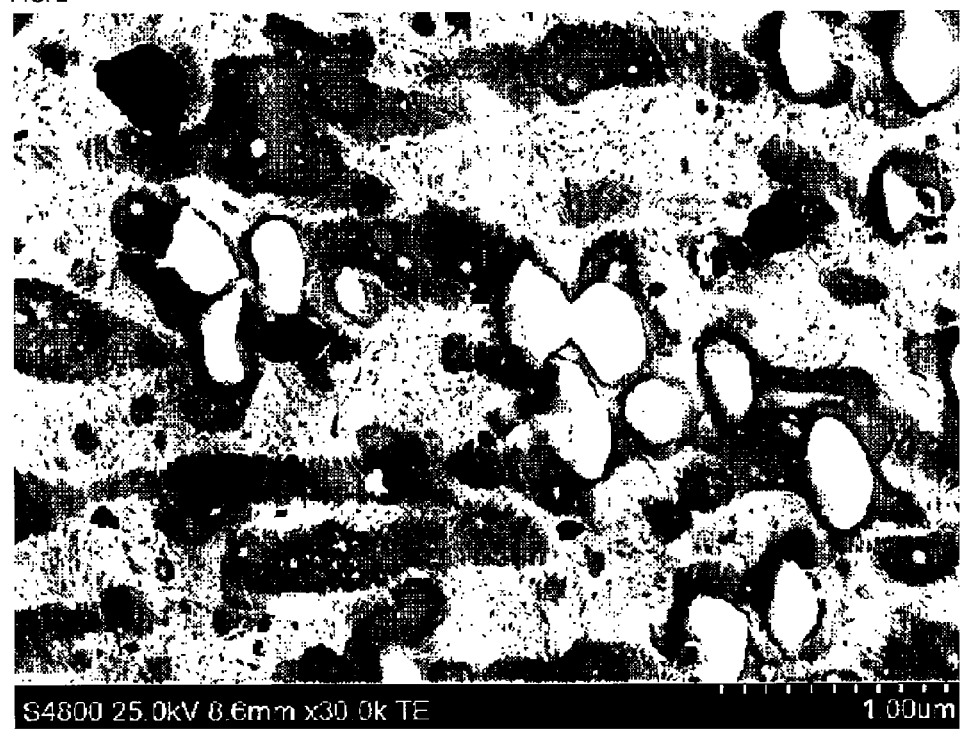
FIG. 2 is an STEM photograph of a core portion of the molded article obtained in Example 41.

FIGS. 1 and 2 show an example of the morphology of the molded article and are STEM photographs of the core portion of the molded article obtained in Example 41 of the present invention.

The flow direction in FIG. 1 is from left to right in FIG. 1. The light gray regions are the polybutylene terephthalate resin (A) phase and the darker gray regions are the polycarbonate resin (B) phase, and it is shown that the two form a co-continuous phase structure. The elastomer (C) phase is present as white circular shapes in this polycarbonate resin (B) phase, and it is shown that the elastomer (C) is present in the polycarbonate resin (B) phase.

The black regions with a large particle diameter present in the polybutylene terephthalate resin (A) phase of the light gray regions are the antimony compound (E) (antimony trioxide in FIG. 1), and it was also confirmed that at least 80% of the antimony compound (E) is present dispersed in the polybutylene terephthalate resin (A) phase. The black regions with a small particle diameter are thought to be titanium dioxide. In addition, the flame retardant (D) is thought to be present in the polycarbonate resin (B) phase.

The average diameter of the elastomer (C) in the polycarbonate resin (B) phase in the core portion of the molded article is preferably at least 200 nm, more preferably at least 300 nm, and even more preferably at least 400 nm, and is preferably not more than 2 μm, more preferably not more than 1.5 μm, even more preferably not more than 1.2 μm, and particularly preferably not more than 1 μm.

The average diameter of the antimony compound (E) is preferably not more than 4 μm, more preferably not more than 3 μm, and even more preferably not more than 2 μm.

The particle diameter (disperse diameter) of the domains (or particles) of the elastomer (C) phase and antimony compound (E) can be read using the image directly obtained by observation of the morphology or by subjecting such an image to enhancement of the contrast therein or to shading adjustment or to adjustment of both.

The particle diameter and so forth of the elastomer (C) phase and antimony compound (E) is calculated by measuring at least 200 particle diameters and taking the arithmetic average of the maximum diameters.

Moreover, the elastomer (C) phase in the surface layer portion of the molded article from the polybutylene terephthalate resin composition preferably extends in the resin flow direction and has a ratio between its long diameter and short diameter (long diameter/short diameter) of 3 to 20, more preferably 4 to 17, and even more preferably 6 to 15. The long diameter refers to the maximum diameter of the elastomer particle and the short diameter refers to the maximum diameter among the diameters in the direction perpendicular to the long diameter. The surface layer portion refers to the region extending to a depth of 20 μm from the surface of the molded article.

Figure 3:
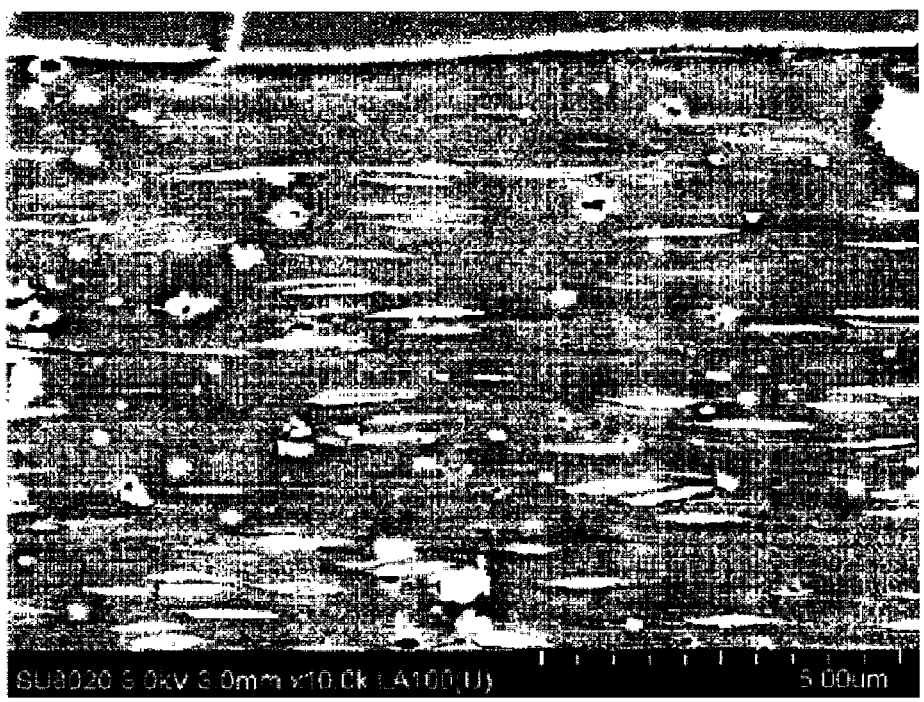
FIG. 3 is an SEM photograph of a surface layer portion of the molded article obtained in Example 41.

This preferred morphology for the surface layer portion of the molded article can be confirmed, for example, by observation of FIG. 3. FIG. 3 is an SEM photograph of the surface layer portion of the molded article obtained in Example 41 of the present invention.

In FIG. 3, the resin flow direction during molding is the direction from the left of the figure to the right. The elastomer (C) phase has a light gray color and presents a slender extension in the horizontal direction, and extension in the resin flow direction can thus be confirmed. It is thought that the polybutylene terephthalate resin (A) and the polycarbonate resin (B) form a laminar structure. The white regions with a large particle diameter are thought to be the antimony compound (E), while the small particle diameter regions are thought to be titanium dioxide.

The molded article of the present invention preferably has this unique morphological structure.

[Preferred Methods for Controlling the Morphology of the Molded Article]

By having the morphological structure described in the preceding, the molded article becomes a flame retardant molded article that has both a superior flame retardancy and a superior impact resistance.

While the polybutylene terephthalate resin composition used to produce the molded article is preferably produced by a melt kneading technique using a melt kneader such as an extruder, it is difficult to stably form the morphological structure specified above by just mixing the individual starting components of the polybutylene terephthalate resin composition and simply kneading, and kneading by particular methods is recommended.

Preferred production methods for stably forming the morphological structure specified above are described hereinbelow.

Pellets are produced by mixing the polybutylene terephthalate resin (A), polycarbonate resin (B), flame retardant (D), antimony compound (E), and elastomer (C) in their respective prescribed proportions; then feeding to a die nozzle-equipped single-screw or twin-screw extruder; subsequently melt kneading and extruding the resin composition from the die nozzle into strand form; and thereafter cutting.

A twin-screw extruder is preferably used as the melt kneading device here. Moreover, L/D, i.e., the ratio between the screw length L (mm) and the diameter D (mm) of the same screw, preferably satisfies the relationship 10<(L/D) <150, more preferably satisfies the relationship 15<(L/D) <120, even more preferably satisfies the relationship 20<(L/D)<100, and particularly preferably satisfies 30<(L/D)<70. It is difficult to achieve a microdispersion of polycarbonate resin (B), and the flame retardant (D), antimony compound (E) and elastomer (C) when this ratio is 10 or less; conversely, at above 150 the flame retardant (D) undergoes substantial thermal deterioration and achieving a microdispersion becomes problematic, making this disadvantageous.

The shape of the die nozzle is also not particularly limited, but viewed from the perspective of the pellet shape a circular nozzle with a diameter of 1 to 10 mm is preferred while a circular nozzle with a diameter of 2 to 7 mm is more preferred.

The melting temperature for the resin composition during melt kneading is preferably 200 to 300° C. and is more preferably 210 to 295° C. Melting is inadequate and unmelted gel is readily produced in large amounts at melting temperatures below 200° C. Conversely, above 300° C. is disadvantageous due to thermal deterioration of the resin composition and facile discoloration.

The screw rotation rate during melt kneading is preferably 100 to 1,000 rpm and more preferably 150 to 800 rpm. When the screw rotation rate is less than 100 rpm, it tends to be difficult to bring about a microdispersion of the flame retardant (D), antimony compound (E), and elastomer (C). Conversely, above 1,000 rpm is unfavorable because the antimony compound (E) then aggregates and microdispersion tends not to occur. The extrusion rate is preferably 5 to 1,000 kg/hr and is more preferably 10 to 900 kg/hr. At an extrusion rate below 5 kg/hr, the dispersibility of the antimony compound (E) assumes a declining trend. Above 1,000 kg/hr is unfavorable because the dispersibility of the antimony compound (E) then assumes a declining trend due to its re-aggregation.

The shear rate of the polybutylene terephthalate resin composition at the die nozzle is preferably 10 to 10,000 $\sec^{-1}$, more preferably 50 to 5,000 $\sec^{-1}$, and even more preferably 70 to 1,000 $\sec^{-1}$. The use of the indicated range for the shear rate is preferred because this inhibits re-aggregation of the flame retardant (D), antimony compound (E), and elastomer (C) and facilitates the stable formation of the morphology specified for the present invention. This shear rate is generally determined by the extrusion rate of the resin composition and the shape of the cross section of the die nozzle; for example, when the cross section of the die nozzle is circular, it can be calculated as follows.

$$\gamma = 4Q/\pi r^3$$

Here, $\gamma$ is the shear rate ($\sec^{-1}$), Q is the extrusion rate (cc/sec) of the resin composition per single die nozzle, and r is the radius (cm) of the die nozzle cross section.

The resin composition extruded in strand form from the die nozzle is converted into a pellet shape by cutting with, for example, a pelletizer. The strand is preferably cooled to provide a strand surface temperature at cutting of 60 to 150° C. and particularly 70 to 150° C. Cooling may generally be carried out by, for example, an air cooling method or a water cooling method, but water cooling is preferred from the standpoint of the cooling efficiency. With regard to this water cooling, cooling may be carried out by passing the strand through a water bath, and the desired strand surface temperature can be provided by adjustment of the water temperature and the cooling time. When the thusly produced pellets have a cylindrical shape, the diameter is preferably 1 to 8 mm, more preferably 2 to 6 mm, and even more preferably 3 to 5 mm, and the length is preferably 1 to 10 mm, more preferably 2 to 6 mm, and even more preferably 3 to 5 mm.

In addition, the relationship between this shear rate $\gamma$ ($\sec^{-1}$) at the die nozzle and the surface temperature T ($°$ C.) of the strand at strand cutting preferably satisfies the relationship $$1\times10^3 < (\gamma \cdot T) < 9.9\times10^5$$

because the electrical insulating performance, toughness, and flame retardancy then increase. The stable formation of the hereabove-specified morphological structure is more easily brought about by having the value of ($\gamma \cdot T$) be in the indicated range. In addition, the rough skin effect at the molding surface caused by poor dispersion of the various components of the resin composition is readily inhibited; the decline in toughness caused by re-aggregation of the flame retardant (D), antimony compound (E), and elastomer (C) is readily inhibited; and maintenance of excellent mechanical properties, an excellent flame retardancy, excellent insulating properties, and so forth is facilitated. The lower limit for ($\gamma \cdot T$) is more preferably $1\times10^4$ and the upper limit is more preferably $8.5\times10^5$.

The aforementioned shear rate and strand surface temperature may be adjusted in order to adjust the value of ($\gamma \cdot T$) into the range indicated above.

A polybutylene terephthalate resin composition having the hereabove-specified morphological structure can be produced by using a single one of the preferred conditions indicated above or by using a combination of a plurality thereof, but it is effective here to use production conditions whereby the value of ($\gamma \cdot T$) satisfies the formula given above.

The use of such a method to produce a polybutylene terephthalate resin composition makes possible the stable production of polybutylene terephthalate resin composition molded articles that have the hereabove-specified morphological structure. However, this production is not limited to the instant method, and other methods may be used as long as the hereabove-specified morphological structure is obtained.

In order to facilitate the stable formation of molded articles having the hereabove-specified morphological structure, the molded articles are also preferably produced from the polybutylene terephthalate resin composition using the following methods∩conditions (1) to (8).

(1) When the flame retardant (D) is a brominated polycarbonate flame retardant, the content of chlorine compounds present as impurities in the brominated polycarbonate flame retardant is brought to generally not more than 0.2 mass % and preferably not more than 0.1 mass %, more preferably not more than 0.08 mass %, even more preferably not more than 0.05 mass %, and particularly preferably not more than 0.03 mass %. The stable formation of the hereabove-specified morphological structure is facilitated by such control.

The chlorine compound impurities are, for example, chlorinated bisphenol compounds. The stable formation of the hereabove-specified morphological structure is made difficult when such chlorine compounds are present in amounts greater than that given above. The chlorine compound content can be quantitated as the decane value by analysis by a gas chromatographic method of the gas produced by heating for 10 minutes at 270° C.

(2) Bringing the amounts of free bromine, chlorine, and sulfur in the polybutylene terephthalate resin composition to or below specific levels is also effective for facilitating the stable formation of the hereabove-specified morphological structure. The amount of free bromine is preferably brought to 800 ppm or less, more preferably 700 ppm or less, even more preferably 650 ppm or less, and particularly preferably 480 ppm or less. In addition, since removing free bromine to 0 ppm requires an economically unsupportable purification, the lower limit amount here is generally 1 ppm and is preferably 5 ppm and is more preferably 10 ppm.

The amount of free chlorine is preferably brought to 500 ppm or less, more preferably 350 ppm or less, even more preferably 200 ppm or less, and particularly preferably 150 ppm or less. With regard to the chlorine content in the resin composition, there are no limitations as to what form•state the chlorine present in the resin composition may assume. Since chlorine may be admixed from various sources, e.g., the starting materials, additives, and catalyst used, the polymerization atmosphere, the cooling water for the resin, and so forth, the total of these admixed amounts is preferably controlled to 500 ppm or less.

The amount of free sulfur is preferably brought to 250 ppm or less, more preferably 200 ppm or less, even more preferably 150 ppm or less, and particularly preferably 100 ppm or less. With regard to the sulfur content in the resin composition, there are no limitations as to what form•state the sulfur present in the resin composition may assume. Since sulfur may be admixed from various sources, e.g., the starting materials, additives, and catalyst used, the polymerization atmosphere, and so forth, the total of these admixed amounts is preferably controlled to 250 ppm or less.

The content of the free bromine, chlorine, and sulfur in the polybutylene terephthalate resin composition can be measured by a combustion ion chromatographic method. In specific terms, the determination can be carried out by heating the resin composition at 270° C. for 10 minutes in an argon atmosphere using an "AQF-100" automatic sample combustion device from Mitsubishi Chemical Analytech Co., Ltd. and quantitating the amounts of the bromine, chlorine, and sulfur produced using an "ICS-90" from Nippon Dionex Kabushiki Kaisha.

(3) The use of antimony trioxide for the antimony compound (E).

(4) The use of a brominated polycarbonate flame retardant for the flame retardant (D). In comparison to other flame retardants, brominated polycarbonate flame retardants are more easily incorporated into the polycarbonate resin (B) phase and as a consequence the polycarbonate resin phase (B) is enlarged by this and the formation of a co-continuous structure of the polybutylene terephthalate resin (A) and polycarbonate resin (B) is facilitated.

(5) The use of a relatively large particle diameter of 300 to 1,500 nm for the average particle diameter of the elastomer (C). By doing this, the polycarbonate resin (B) phase that has incorporated the elastomer (C) is enlarged and contact of the polycarbonate resin (B) phase with itself is facilitated, which serves to facilitate the formation of a co-continuous structure in the core portion; in addition, orientation of the elastomer (C) phase in the resin flow direction is facilitated in the surface layer portion.

(6) Incorporation of the antimony compound (E) in the form of a masterbatch with the polybutylene terephthalate resin (A). This facilitates the presence of the antimony compound (E) in the polybutylene terephthalate resin (A) phase.

(7) Incorporation of zinc stearyl acid phosphate as a stabilizer. By doing this, transesterification between the polybutylene terephthalate resin (A) and polycarbonate resin (B) is more readily inhibited and the thermal stability during melt kneading and the molding process is then excellent, and as a consequence the stable formation of a molded article having the morphological structure of the present invention is facilitated.

(8) A variety of tactics can be offered as examples when the molded article is produced by injection molding, for example: the selection of the molder conditions, such as the screw structure of the injection molder, the processing by the screw and cylinder inner wall, the nozzle diameter, the structure of the mold, and so forth; the adjustment of molding conditions during plasticizing, metering, injecting and so forth; and the addition of other components to the molding material. In particular, adjustment of, for example, the cylinder temperature, back pressure, screw rotation rate, and injection rate, is preferred with respect to the conditions during plasticizing, metering, and injecting. For example, in the case of adjustment of the cylinder temperature, it is set preferably to 230 to 280° C. and more preferably to 240 to 270° C. In the case of adjustment of the back pressure, it is set preferably to 2 to 15 MPa and more preferably to 4 to 10 MPa. In the case of adjustment of the screw rotation rate, it is set to preferably 20 to 300 rpm and more preferably to 20 to 250 rpm. In the case of adjustment of the injection rate, molding conditions of preferably 5 to 1,000 mm/sec, more preferably 10 to 900 mm/sec, and particularly preferably 20 to 800 mm/sec, 30 to 700 mm/sec, and 40 to 500 mm/sec are used for the injection rate. Doing this facilitates the orientation of the elastomer (C) phase in the surface layer portion in the resin flow direction. Among the preceding, the use of adjustment of the injection rate is a particularly preferred tactic for better facilitating orientation of the elastomer (C) phase in the surface layer portion of the molded article.

In particular, it is thought that, through the execution of (4) to (8), a co-continuous structure between the polybutylene terephthalate resin (A) and polycarbonate resin (B) is formed in the core portion and the impact resistance is improved, and, in addition, that through the orientation of the elastomer (C) phase in the surface layer portion, the extension of impact-induced crazing is stopped by the oriented elastomer phase, leading to an enhanced impact resistance.

In addition, because the antimony compound (E), which readily causes deterioration of the polycarbonate resin (B), is preferentially present in the polybutylene terephthalate resin (A) phase, its negative effect on the polycarbonate resin (B) can be inhibited and the reduction in the impact resistance tends to be suppressed.

These methods & conditions (1) to (8) are preferably used individually or in combinations of a plurality thereof and may also be used in combination with the previously described conditions for producing the resin composition.

The polybutylene terephthalate resin composition of the present invention as obtained by the methods described in the preceding has a crystallization temperature of preferably at least 100° C., more preferably at least 130° C., and even more preferably at least 140° C. The flame retardancy at a thickness of 1.5 mm based on UL94 is preferably rated V-0 and the flame retardancy at a thickness of 3.0 mm based on the UL94 5V test is preferably rated 5VA. In addition, the notched Charpy impact strength is preferably at least 30 kJ/m$^2$, more preferably at least 40 kJ/m$^2$, and even more preferably at least 45 kJ/m$^2$. With regard to the surface impact strength, the height when the molding undergoes complete rupture is preferably at least 80 cm, more preferably at least 100 cm, and even more preferably at least 150 cm. The methods for evaluating the crystallization temperature, the flame retardancy, and the impact resistance are described in the examples below.

[Moldings]

Moldings obtained by the molding of the polybutylene terephthalate resin composition of the present invention are well suited for electrical and electronic parts, automotive parts and other electrical parts, mechanical parts, and parts for household appliances such as cookware, for example, charger connectors for electric automobiles, battery capacitor holders, battery capacitor housings, housings for charging stands for electric automobile, housings for electrical and electronic equipments, connectors, relays, switches, sensors, actuators, terminal switches, parts for rice cookers, parts for grilling cookware, and so forth. They are well suited for use in particular for charger connectors for electric automobiles, battery capacitor holders, battery capacitor housings, and housings for charging stands for electric automobiles.

A charger connector for an electric automobile is a contact connector for the electric automobile charger used in a facility equipped with a charger for performing a charging when the quantity of charge has declined. A battery capacitor holder is a holder that holds a large-capacity capacitor used as an emergency auxiliary power supply separate from a charger (battery). A battery capacitor housing is a housing that is a component of such a capacitor. A housing for charging stands for an electric automobile is a housing that is a component of a stand for charging the battery of an electric automobile from a 100 V or 200 V alternating-current power source.

The shape, size, thickness, and so forth of these moldings may be freely selected.

There are no particular limitations on the method for producing these moldings using the resin composition, and the molding techniques generally used with polyester resin compositions can be used without limitation. Examples here are injection molding methods, ultrahigh speed injection molding methods, injection compression molding methods, two-color molding methods, hollow molding methods such as gas-assisted, molding methods that use insulated molds, molding methods that use rapidly heated molds, foam molding (also including supercritical fluids), insert molding, IMC (in-mold coating molding) molding methods, extrusion molding methods, sheet molding methods, thermoforming methods, rotational molding methods, lamination molding methods, press molding methods, and blow molding methods. Injection molding is preferred among the preceding.

EXAMPLES

The present invention is more specifically described below through examples. However, the present invention should not be construed as being limited to or by the examples that follow.

Examples 1 to 17 and Comparative Examples 1 and 2

The components used are given in Table 1 below.

TABLE 1

| component | code | |
|---|---|---|
| polybutylene terephthalate resin (A) | A1-1 | "Novaduran (registered trademark) 5007" from Mitsubishi Engineering-Plastics Corporation, [η]: 0.70 dl/g |
| | A1-2 | "Novaduran (registered trademark) 5009" from Mitsubishi Engineering-Plastics Corporation, [η]: 1.0 dl/g |
| | A1-3 | "Novaduran (registered trademark) 5020" from Mitsubishi Engineering-Plastics Corporation, [η]: 1.2 dl/g |
| polycarbonate resin (B) | B1-1 | "Novarex (registered trademark) 7030PJ" from Mitsubishi Engineering-Plastics Corporation, Mv: 30,000 |
| | B1-2 | "Novarex (registered trademark) 7022PJ" from Mitsubishi Engineering-Plastics Corporation, Mv: 22,000 |
| elastomer (C) | C1-1 | "Paraloid EXL5136" from Rohm and Haas Japan KK, core/shell graft copolymer of polybutyl acrylate (core)/polymethyl methacrylate (shell), average particle diameter: 5 μm |
| | C1-2 | "Paraloid EXL2313" from Rohm and Haas Japan KK, core/shell graft copolymer of polybutyl acrylate (core)/polymethyl methacrylate (shell), average particle diameter: 500 nm, glass transition temperature: −38.2° C. |
| | C1-3 | "Paraloid EXL2315" from Rohm and Haas Japan KK, core/shell graft copolymer of polybutyl acrylate (core)/polymethyl methacrylate (shell), average particle diameter: 300 nm, glass transition temperature: −36.9° C. |
| | C1-4 | "Paraloid KM336P" from Rohm and Haas Japan KK, core/shell graft copolymer of polybutyl acrylate (core)/polymethyl methacrylate (shell), average particle diameter: 150 nm, glass transition temperature: −31.2° C. |
| | C1-5 | "Kaneace M-711" from the Kaneka Corporation, core/shell graft copolymer of butadiene (core)/methyl methacrylate (shell), average particle diameter: 200 nm, butadiene content: 80 mass % |
| | C1-6 | "Kaneace M-732" from the Kaneka Corporation, graft copolymer of butadiene (core)/methyl methacrylate-styrene (shell), average particle diameter: 180 nm, butadiene content: 77 mass % |
| | C1-7 | Metablen S-2001 (trade name) from Mitsubishi Rayon Co., Ltd., core/shell copolymer of silicone-polybutyl acrylate (core)/methyl methacrylate (shell), average particle diameter: 200 nm, glass transition temperature: −30.1° C. |
| pigment | I1-1 | titanium dioxide, "Tipaque CR-60" from Ishihara Sangyo Kaisha, Ltd., average particle diameter: 0.21 μm |
| | I1-2 | carbon black, "#900" from Mitsubishi Chemical Corporation |
| flame retardant (D) | D1-1 | brominated polycarbonate, "FR53" from Mitsubishi Gas Chemical Company, Inc., bromine content: 58 mass % |
| | D1-2 | brominated polystyrene, "PBS-64HW" from Chemtura Japan Limited, bromine content: 64 mass %, mass-average molecular weight: 60,000 |
| antimony compound (E) | E1-1 | antimony trioxide, "GMA" from Yamanaka Sangyo Co., Ltd., antimony content: 83.5 mass % |
| | E1-2 | complex salt of sodium oxide and antimony pentoxide, "Sanepoch NA-1030" from Nissan Chemical Industries, Ltd., antimony content: 73 mass % |
| anti-dripping agent | F1 | polytetrafluoroethylene, "TF1750" from Sumitomo 3M Limited |
| stabilizer | G1-1 | pentaerythritol tetrakis[3-(3,5-di-tert-butyl-4-hydroxyphenyl)propionate], "Irganox 1010" from BASF |
| | G1-2 | zinc stearyl acid phosphate, "JP-518Zn" from Johoku Chemical Co., Ltd. |
| | G1-3 | compound with the chemical formula O=P(OH)$_n$(OC$_{18}$H$_{37}$)$_{3-n}$ (n is a mixture of 1 and 2), "Adeka Stab AX-71" from the ADEKA Corporation |
| ultraviolet absorber | H1 | 2-(2'-hydroxy-5'-t-octylphenyl)benzotriazole, "Seesorb 709" from Shipro Kasei Kaisha, Ltd. |
| mold-release agent | J1 | oxidized polyethylene, "Licowax PED 522" from Clariant, acid value: 22 to 28 mg KOH, drop point: 102 to 107° C. |

The components shown in Table 1 above were mixed to uniformity in a tumbler mixer in the proportions (mass parts) given in Tables 2 to 4 and were then melt kneaded using a twin-screw extruder ("TEX-30α", L/D=52, from The Japan Steel Works, Ltd.) at a barrel set temperature of 250° C. and a screw rotation rate of 200 rpm to provide a resin composition, and this resin composition was quenched in a water bath and pelletized using a pelletizer to obtain pellets of a polybutylene terephthalate resin composition. The properties of the obtained pellets were evaluated using test specimens obtained by injection molding using an injection molder (NEX80-9E, from Nissei Plastic Industrial Co., Ltd.) at a cylinder temperature of 250° C. and a mold temperature of 80° C. and a cooling time of 15 seconds for the evaluations other than the mold-releasability evaluation (3), infra, and a cooling time of 20 seconds for the mold-releasability evaluation (3). The resin composition was dried for 6 to 8 hours at 120° C. up to just before molding.

(1) Impact Resistance

Charpy Impact Strength:

An ISO multipurpose test specimen (thickness=4.0 mm) was injection molded; a notched test specimen with a thickness of 4.0 mm was fabricated from this test specimen in conformity with the ISO 179 standard; and the notched Charpy impact strength (unit: kJ/m$^2$) was measured.

Surface Impact Strength:

A box-shaped molding (wall thickness=1.5 mmt) with a size of 150×80×40 mm was molded; a 2.975 kg steel ball was dropped on it from a prescribed height; and the height (unit: cm) at which the molding underwent complete rupture was determined. A better surface impact behavior is indicated by a higher height at which complete rupture occurs. Testing was performed up to a height of 105 cm, and a sample that did not rupture at 105 cm is indicated in the tables by ">100".

(2) Flame Retardancy

Test specimens (125 mm×12.5 mm×1.5 mmt) for UL94 testing were molded and rated for V-0, V-1, and V-2 in conformity with the UL94 standard.

A test specimen (125 mm×12.5 mm×3.0 mmt) for UL94 5V bar testing and a test specimen (150 mm×150 mm×3.0 mmt) for 5V plate testing were molded and 5VA and 5VB ratings were assigned in conformity with UL94 5V testing.

(3) Moldability

Fluidity (Peak Molding Pressure):

The peak molding pressure (unit: MPa) during injection molding of the ISO test specimen was measured.

Mold-Releasability:

The Mold-Releasability was Evaluated During the Injection molding of a box-shaped molding (wall thickness=1.5 mmt) with a size of 150 mm×80 mm×40 mm. A score of "O" was assigned when there were no ejector pin marks on the molding; a score of "Δ" was assigned when ejector pin marks were present; and a score of "x" was assigned when an ejector pin penetrated the molding and cracks were produced.

(4) Tensile Strength

An ISO test specimen was injection molded and the tensile strength (unit: MPa) was measured in conformity with the ISO 527 standard both before and after the moist heat resistance test; the measurement was performed at a tensile rate of 50 mm/minute.

(5) Color Difference

Using the test specimen before and after the heat aging resistance test and the test specimen before and after the lightfastness test, the color difference was measured with a "CE-7000A" from GretagMacbeth (light source: D65, field: 10°, mode: SCI) and ΔE* was determined.

(6) Heat Aging Resistance Test

A plate molding with a size of 100 mm×100 mm×3 mmt was injection molded and was held for 100 hours in a convection oven at a temperature of 160° C.

(7) Lightfastness Test

A molding with a size of 100 mm×100 mm×3 mmt was injection molded and subjected to a lightfastness treatment under the following conditions using a xenon weathering test instrument.

instrument used: Ci4000 from Atlas
filter/inner: quartz
filter/outer: type S borosilicate
black panel temperature: 63° C.
irradiance: 0.55 W/m$^2$ (at 340 nm)
treatment time: 1,000 hours
no rain
humidity: 50%

(8) Moist Heat Resistance Test

An ISO test specimen was injection molded and was held for 50 hours in a pressure cooker tester at a temperature of 121° C., humidity of 100%, and pressure of 2 atm.

The results of these evaluations are given in the following Tables 2 to 4.

TABLE 2

| component | code | examples | | | | |
|---|---|---|---|---|---|---|
| | | 1 | 2 | 3 | 4 | 5 |
| polybutylene terephthalate resin (A) | A1-1 | | | | | 24 |
| | A1-2 | 60 | 60 | 60 | 60 | |
| | A1-3 | | | | | 36 |
| polycarbonate resin (B) | B1-1 | 40 | 40 | 40 | 40 | 40 |
| | B1-2 | | | | | |
| elastomer (C) | C1-1 | | | | | |
| | C1-2 | 10 | 10 | 10 | 10 | 10 |
| | C1-3 | | | | | |
| | C1-4 | | | | | |
| | C1-5 | | | | | |
| | C1-6 | | | | | |
| | C1-7 | | | | | |
| pigment | I1-1 | | 3.9 | | 3.9 | 3.9 |
| | I1-2 | | | 0.5 | | |
| flame retardant (D) | D1-1 | 11 | 11 | 11 | 11 | 11 |
| | D1-2 | | | | | |
| antimony compound (E) | E1-1 | 2.5 | 2.6 | 2.5 | 2.6 | 2.6 |
| | E1-2 | | | | | |
| anti-dripping agent | F1 | 0.2 | 0.2 | 0.2 | 0.2 | 0.2 |
| stabilizer | G1-1 | 0.4 | 0.4 | 0.4 | 0.4 | 0.4 |
| | G1-2 | 0.4 | 0.4 | 0.4 | | 0.4 |
| | G1-3 | | | | 0.4 | |
| ultraviolet absorber | H1 | | | | | |
| mold-release agent | J1 | 0.6 | 0.6 | 0.6 | 0.6 | 0.6 |
| flame retardancy | | | | | | |
| UL94 (1.5 mmt) | | V-0 | V-0 | V-0 | V-0 | V-0 |
| 5V (3.0 mmt) | | 5VA | 5VA | 5VA | 5VA | 5VA |
| impact resistance | | | | | | |
| notched Charpy impact strength (kJ/m$^2$) | | 45 | 48 | 45 | 50 | 50 |
| surface impact strength (cm) | | >100 | >100 | >100 | >100 | >100 |
| thermal aging resistance | | | | | | |
| thermal discoloration resistance (ΔE*) | | 20 | 14 | 0.5 | 15 | 14 |
| lightfastness | | | | | | |
| photodiscoloration resistance (ΔE*) | | 18 | 12 | 0.5 | 12 | 12 |
| moist heat resistance | | | | | | |
| tensile strength (MPa) | | 56 | 58 | 56 | 58 | 58 |
| tensile strength (MPa) after treatment | | 40 | 48 | 47 | 40 | 49 |
| moldability | | | | | | |
| fluidity (peak molding pressure: MPa) | | 92 | 92 | 93 | 90 | 99 |
| mold-releasability | | O | O | O | Δ | O |

TABLE 3

| component | code | examples | | | | | | |
|---|---|---|---|---|---|---|---|---|
| | | 6 | 7 | 8 | 9 | 10 | 11 | 12 |
| polybutylene terephthalate resin (A) | A1-1 | | | | | | | |
| | A1-2 | | | | | 60 | 60 | 60 |
| | A1-3 | 60 | 60 | 60 | 60 | | | |
| polycarbonate resin (B) | B1-1 | 40 | 40 | 40 | 40 | 40 | 40 | 40 |
| | B1-2 | | | | | | | |
| elastomer (C) | C1-1 | 10 | | | | | | |
| | C1-2 | | 10 | | | | | |
| | C1-3 | | | 10 | | | | |
| | C1-4 | | | | 10 | | | |
| | C1-5 | | | | | 10 | | |
| | C1-6 | | | | | | 10 | |
| | C1-7 | | | | | | | 10 |
| pigment | I1-1 | 3.9 | 3.9 | 3.9 | 3.9 | 3.9 | 3.9 | 3.9 |
| | I1-2 | | | | | | | |

TABLE 3-continued

| component | code | examples 6 | 7 | 8 | 9 | 10 | 11 | 12 |
|---|---|---|---|---|---|---|---|---|
| flame retardant (D) | D1-1 | 11 | 11 | 11 | 11 | 11 | 11 | 11 |
|  | D1-2 |  |  |  |  |  |  |  |
| antimony compound (E) | E1-1 | 2.6 | 2.6 | 2.6 | 2.6 | 2.6 | 2.6 | 2.6 |
|  | E1-2 |  |  |  |  |  |  |  |
| anti-dripping agent | F1 | 0.2 | 0.2 | 0.2 | 0.2 | 0.2 | 0.2 | 0.2 |
| stabilizer | G1-1 | 0.4 | 0.4 | 0.4 | 0.4 | 0.4 | 0.4 | 0.4 |
|  | G1-2 | 0.4 | 0.4 | 0.4 | 0.4 | 0.4 | 0.4 | 0.4 |
|  | G1-3 |  |  |  |  |  |  |  |
| ultraviolet absorber | H1 |  |  |  |  |  |  |  |
| mold-release agent | J1 | 0.6 | 0.6 | 0.6 | 0.6 | 0.6 | 0.6 | 0.6 |
| flame retardancy |  |  |  |  |  |  |  |  |
| UL94 (1.5 mmt) |  | V-0 | V-0 | V-0 | V-0 | V-0 | V-0 | V-1 |
| 5V (3.0 mmt) |  | 5VA | 5VA | 5VA | 5VA | 5VA | 5VA | 5VA |
| impact resistance |  |  |  |  |  |  |  |  |
| notched Charpy impact strength (kJ/m²) |  | 15 | 52 | 51 | 50 | 40 | 39 | 45 |

| component | code | examples 6 | 7 | 8 | 9 | 10 | 11 | 12 |
|---|---|---|---|---|---|---|---|---|
| surface impact strength (cm) |  | 80 | >100 | >100 | >100 | >100 | >100 | >100 |
| heat aging resistance |  |  |  |  |  |  |  |  |
| thermal discoloration resistance (ΔE*) |  | 14 | 14 | 14 | 15 | 41 | 35 | 13 |
| lightfastness |  |  |  |  |  |  |  |  |
| photodiscoloration resistance (ΔE*) |  | 12 | 12 | 12 | 12 | 32 | 26 | 10 |
| moist heat resistance |  |  |  |  |  |  |  |  |
| tensile strength (MPa) |  | 50 | 55 | 55 | 55 | 55 | 56 | 56 |
| tensile strength (MPa) after treatment |  | 38 | 49 | 49 | 48 | 40 | 48 | 48 |
| moldability |  |  |  |  |  |  |  |  |
| fluidity (peak molding pressure: MPa) |  | 100 | 99 | 101 | 100 | 95 | 93 | 91 |
| mold-releasability |  | Δ | ○ | ○ | ○ | ○ | ○ | ○ |

TABLE 4

| component | code | examples 13 | 14 | 15 | 16 | 17 | comparative examples 1 | 2 |
|---|---|---|---|---|---|---|---|---|
| polybutylene terephthalate resin (A) | A1-1 |  |  | 60 |  |  |  |  |
|  | A1-2 | 60 | 60 |  | 60 | 60 | 60 |  |
|  | A1-3 |  |  |  |  |  |  | 100 |
| polycarbonate resin (B) | B1-1 | 40 |  | 40 | 40 | 40 | 40 |  |
|  | B1-2 |  | 40 |  |  |  |  |  |
| elastomer (C) | C1-1 |  |  |  |  |  |  |  |
|  | C1-2 | 10 | 10 | 10 | 10 | 10 |  | 10 |
|  | C1-3 |  |  |  |  |  |  |  |
|  | C1-4 |  |  |  |  |  |  |  |
|  | C1-5 |  |  |  |  |  |  |  |
|  | C1-6 |  |  |  |  |  |  |  |
|  | C1-7 |  |  |  |  |  |  |  |
| pigment | I1-1 | 3.9 | 3.9 | 3.9 | 3.8 | 3.9 | 3.5 | 3.9 |
|  | I1-2 |  |  |  |  |  |  |  |
| flame retardant (D) | D1-1 | 11 | 11 | 11 |  | 11 | 10 | 11 |
|  | D1-2 |  |  |  | 10 |  |  |  |
| antimony compound (E) | E1-1 | 2.6 | 2.6 | 2.6 | 2.6 |  | 2.3 | 2.6 |
|  | E1-2 |  |  |  |  | 3.0 |  |  |
| anti-dripping agent | F1 | 0.2 | 0.2 | 0.2 | 0.2 | 0.2 | 0.2 | 0.2 |
| stabilizer | G1-1 | 0.4 | 0.4 | 0.4 | 0.4 | 0.4 | 0.4 | 0.4 |
|  | G1-2 | 0.4 | 0.4 | 0.4 | 0.4 | 0.4 | 0.4 | 0.4 |
|  | G1-3 |  |  |  |  |  |  |  |
| ultraviolet absorber | H1 | 0.4 |  |  |  |  |  |  |
| mold-release agent | J1 | 0.6 | 0.6 | 0.6 | 0.6 | 0.6 | 0.6 | 0.6 |
| flame retardancy |  |  |  |  |  |  |  |  |
| UL94 (1.5 mmt) |  | V-0 | V-0 | V-0 | V-1 | V-0 | V-0 | does not pass |
| 5V (3.0 mmt) |  | 5VA | 5VA | 5VA | 5VA | 5VA | 5VA | 5VB |
| impact resistance |  |  |  |  |  |  |  |  |
| notched Charpy impact strength (kJ/m²) |  | 48 | 17 | 18 | 18 | 13 | 7 | 5 |
| surface impact strength (cm) |  | >100 | 80 | 80 | 75 | 55 | 30 | 30 |
| heat aging resistance |  |  |  |  |  |  |  |  |
| thermal discoloration resistance (ΔE*) |  | 12 | 14 | 14 | 19 | 13 | 8 | 18 |
| lightfastness |  |  |  |  |  |  |  |  |
| photodiscoloration resistance (ΔE*) |  | 12 | 12 | 12 | 19 | 11 | 4 | 12 |

TABLE 4-continued

| | | examples | | | | | comparative examples | |
|---|---|---|---|---|---|---|---|---|
| component | code | 13 | 14 | 15 | 16 | 17 | 1 | 2 |
| moist heat resistance | | | | | | | | |
| tensile strength (MPa) | | 58 | 55 | 53 | 55 | 55 | 58 | 55 |
| tensile strength (MPa) after treatment | | 49 | 42 | 38 | 45 | 38 | 35 | 30 |
| moldability | | | | | | | | |
| fluidity (peak molding pressure: MPa) | | 91 | 83 | 84 | 88 | 90 | 73 | 65 |
| mold-releasability | | ◯ | ◯ | ◯ | ◯ | ◯ | X | X |

Examples 21 to 26

The components used are given in Table 5 below.

TABLE 5

| Component | code | |
|---|---|---|
| polybutylene terephthalate resin (A) | A2 | "Novaduran (registered trademark) 5026" from Mitsubishi Engineering-Plastics Corporation, intrinsic viscosity 1.26 dl/g |
| polycarbonate resin (B) | B2 | "Novarex (registered trademark) 7030PJ" from Mitsubishi Engineering-Plastics Corporation, Mv = 30,000 |
| flame retardant (D) | D2 | brominated polycarbonate, "FR-53" from Mitsubishi Gas Chemical Company, Inc., bromine concentration: 58 mass %, free bromine content: 0.11 mass %, chlorine compound content: 0.02 mass % |
| antimony compound (E) | E2 | antimony trioxide, "GMA" from Yamanaka Sangyo Co., Ltd., antimony concentration: 83.5 mass % |
| elastomer (C) | C2 | core/shell graft copolymer of polybutyl acrylate (core)/polymethyl methacrylate (shell), average particle diameter: 580 nm, glass transition temperature: −38.2° C. |
| titanium oxide (F) | F2-1 | "Kronos 2233" from Kronos Worldwide, Inc., average particle diameter: 0.21 μm, titanium oxide that has been surface-treated with alumina hydrate and silicic acid hydrate followed by surface-treatment with dimethylsiloxane |
| | F2-2 | "Tipaque PC-3" from Ishihara Sangyo Kaisha, Ltd., average particle diameter: 0.28 μm, rutile titanium oxide produced by the chlorine method and surface-treated with alumina hydrate and silicic acid hydrate followed by surface-treatment with methylhydrogensiloxane |
| | F2-3 | "Tipaque CR-60" from Ishihara Sangyo Kaisha, Ltd., average particle diameter: 0.21 μm, titanium oxide that has been surface-treated with alumina hydrate |
| Pigment | F2-X | carbon black masterbatch containing 30 mass % carbon black, with a base of "Novaduran 5008" polybutylene terephthalate resin from Mitsubishi Engineering-Plastics Corporation |
| anti-dripping agent | G2 | polytetrafluoroethylene, product name "TF1750" from Sumitomo 3M Limited |
| stabilizer | H2-1 | phenolic stabilizer, product name "Irganox 1010" from BASF |
| | H2-2 | zinc stearyl acid phosphate, product name "JP-518Zn" from Johoku Chemical Co., Ltd. |
| mold-release agent | I2 | oxidized polyethylene, "Licowax PED 522" from Clariant, acid value: 22 to 28 mg KOH, drop point: 102 to 107° C. |

Examples 21 to 26

The components shown in Table 5 above were mixed to uniformity in a tumbler mixer in the proportions (mass parts in all instances) given in Table 6 and were then melt kneaded using a twin-screw extruder ("TEX-30a", L/D=52, from The Japan Steel Works, Ltd.) at a barrel set temperature of 250° C. and a screw rotation rate of 200 rpm to provide a resin composition, and this resin composition was quenched in a water bath and pelletized using a pelletizer to obtain pellets of a polybutylene terephthalate resin composition. Here, the antimony compound (E) was incorporated as a masterbatch of the antimony compound (content of the antimony compound (E) in the masterbatch=70 mass %) in which the base resin was a mixture of 50 mass % of the polybutylene terephthalate resin "Novaduran (registered trademark) 5020" from Mitsubishi Engineering-Plastics Corporation and 50 mass % of the polybutylene terephthalate resin "Novaduran (registered trademark) 5008" from Mitsubishi Engineering-Plastics Corporation.

The properties of the obtained pellets were evaluated using test specimens obtained by injection molding using an injection molder (NEX80-9E, from Nissei Plastic Industrial Co., Ltd.) at a cylinder temperature of 250° C., a mold temperature of 80° C., and a cooling time of 15 seconds. The resin composition was dried for 6 to 8 hours at 120° C. up to just before molding.

(1) Flame Retardancy
This evaluation was carried out as described above.
(2) Impact Strength
The notched Charpy impact strength and the surface impact strength were measured as described above.
(3) Hydrolysis Resistance
The tensile strength (before treatment) (unit: MPa) was measured in conformity with ISO 527 using an ISO multipurpose test specimen (thickness=4.0 mm) at a tensile rate of 50 mm/minute.

Using a pressure cooker tester (Hirayama Manufacturing Corporation), an ISO multipurpose test specimen (thickness=4.0 mm) was treated for 75 hours at a temperature of 121° C., relative humidity of 100%, and pressure of 2 atm, followed by measurement of the tensile strength (after 75 hr treatment) (unit: MPa) as above.
(4) Appearance
The following were injection molded using the pellets of the carbon black-containing resin compositions (Examples 25 and 26): a UL94 combustion test specimen having a thickness of 1.0 mm and formed with a weld line in the center of the test specimen, and a 3-level plate having a region with a thickness of 1.0 mm, a region with a thickness of 2.0 mm, and a region with a thickness of 3.0 mm. The appearance was visually checked at this weld region and at the step regions on the 3-level plate and was evaluated using the following criteria.
O: The appearance is uniform and excellent.
Δ: There are a few areas where the color is darker and the appearance is somewhat impaired, but this is unproblematic at the level of the actual molded article.
X: There are areas where the color is darker, and the appearance is inferior.
The results of these evaluations are collected and given in the following Table 6.

Examples 31 to 36

The components used are given in Table 7 below.

TABLE 7

| Component | code | |
|---|---|---|
| polybutylene terephthalate resin(A) | A3 | "Novaduran (registered trademark) 5026" from Mitsubishi Engineering-Plastics Corporation, intrinsic viscosity 1.26 dl/g |
| polycarbonate resin(B) | B3 | "Novarex (registered trademark) 7030PJ" from Mitsubishi Engineering-Plastics Corporation, Mv = 30,000 |
| flame retardant(D) | D3 | brominated polycarbonate, "FR-53" from Mitsubishi Gas Chemical Company, Inc., bromine concentration: 58 mass %, free bromine content: 0.11 mass %, chlorine compound content: 0.02 mass % |
| antimony compound(E) | E3 | antimony trioxide, "GMA" from Yamanaka Sangyo Co., Ltd., antimony concentration: 83.5 mass % |
| polyolefinic mold-release agent(G) | G3-1 | microcrystalline wax, "Himic 1080" from Nippon Seiro Co., Ltd., number of carbons: 30 to 60, drop point: 84° C. |
| | G3-2 | oxidized polyethylene, "Licowax PED 522" from Clariant, acid value: 22 to 28 mg KOH, drop point: 102 to 107° C. |
| | G3-3 | paraffin wax, "155" from Nippon Seiro Co., Ltd., drop point: 69° C. |
| | G3-4 | polyethylene wax, "Hi-WAX 100P" from Mitsui Chemicals, Inc., drop point: 116° C. |
| elastomer(C) | C3-1 | core/shell graft copolymer of polybutyl acrylate (core)/polymethyl methacrylate (shell), average particle diameter: 580 nm, glass transition temperature: −38.2° C. |
| | C3-2 | core/shell graft copolymer of polybutyl acrylate (core)/polymethyl methacrylate (shell), average particle diameter: 770 nm, glass transition temperature: −54.3° C. |

TABLE 6

| | | examples | | | | | |
|---|---|---|---|---|---|---|---|
| component | code | 21 | 22 | 23 | 24 | 25 | 26 |
| polybutylene terephthalate resin (A) | A2 | 60 | 60 | 60 | 60 | 60 | 60 |
| polycarbonate resin (B) | B2 | 40 | 40 | 40 | 40 | 40 | 40 |
| flame retardant (D) | D2 | 12 | 12 | 12 | 13 | 13 | 12 |
| antimony compound (E) | E2 | 2.7 | 2.7 | 2.7 | 2.7 | 2.7 | 2.7 |
| elastomer (C) | C2 | 11 | 11 | 11 | 11 | 11 | 11 |
| titanium oxide (F) | F2-1 | 3.9 | | | | | 3.9 |
| | F2-2 | | 3.9 | | | | |
| | F2-3 | | | 3.9 | 1.3 | 1.3 | |
| pigment | F2-X | | | | | 4.0 | 4.0 |
| anti-dripping agent | G2 | 0.2 | 0.2 | 0.2 | 0.2 | 0.2 | 0.2 |
| stabilizer | H2-1 | 0.4 | 0.4 | 0.4 | 0.4 | 0.4 | 0.4 |
| | H2-2 | 0.4 | 0.4 | 0.4 | 0.4 | 0.4 | 0.4 |
| mold-release agent | I2 | 0.6 | 0.6 | 0.6 | 0.6 | 0.6 | 0.6 |
| flame retardancy | | | | | | | |
| UL94 (1.5 mmt) | | V-0 | V-0 | V-0 | V-0 | V-0 | V-0 |
| 5V (3.0 mmt) | | 5VA | 5VA | 5VA | 5VA | 5VA | 5VA |
| impact resistance | | | | | | | |
| notched Charpy impact strength (kJ/m$^2$) | | 58 | 57 | 56 | 44 | 40 | 56 |
| surface impact strength (cm) | | >100 | >100 | >100 | >100 | >100 | >100 |
| hydrolysis resistance | | | | | | | |
| tensile strength before treatment (MPa) | | 56 | 57 | 55 | 56 | 55 | 59 |
| tensile strength after treatment (MPa) | | 35 | 20 | 24 | 10 | 9 | 14 |
| appearance | | | | | | | |
| weld region | | | | | | Δ | O |
| step region | | | | | | Δ | O |

TABLE 7-continued

| Component | code | |
|---|---|---|
| anti-dripping agent | H3 | polytetrafluoroethylene, product name "TF1750" from Sumitomo 3M Limited |
| Pigment | F3-1 | titanium dioxide, "Tipaque CR-60" from Ishihara Sangyo Kaisha, Ltd., average particle diameter: 0.21 μm, surface-treated with alumina hydrate |
| | F3-2 | "Kronos 2233" from Kronos Worldwide, Inc., average particle diameter: 0.21 μm, titanium oxide that has been surface-treated with alumina hydrate and silicic acid hydrate followed by surface-treatment with dimethylsiloxane |
| Stabilizer | I3-1 | phenolic stabilizer, product name "Irganox 1010" from BASF |
| | I3-2 | zinc stearyl acid phosphate, product name "JP-518Zn" from Johoku Chemical Co., Ltd. |

The components shown in Table 7 were mixed to uniformity in a tumbler mixer in the proportions (mass parts in all instances) given in Table 8 and were then melt kneaded using a twin-screw extruder ("TEX-30a", L/D=52, from The Japan Steel Works, Ltd.) at a barrel set temperature of 250° C. and a screw rotation rate of 200 rpm to provide a resin composition, and this resin composition was quenched in a water bath and pelletized using a pelletizer to obtain pellets of a polybutylene terephthalate resin composition. Here, the antimony compound (E) was incorporated as a masterbatch of the antimony compound (content of the antimony compound (E) in the masterbatch=70 mass %) in which the base resin was a mixture of 50 mass % of the polybutylene terephthalate resin "Novaduran (registered trademark) 5020" from Mitsubishi Engineering-Plastics Corporation and 50 mass % of the polybutylene terephthalate resin "Novaduran (registered trademark) 5008" from Mitsubishi Engineering-Plastics Corporation.

The properties of the obtained pellets were evaluated using test specimens obtained by injection molding using an injection molder (NEX80-9E, from Nissei Plastic Industrial Co., Ltd.) at a cylinder temperature of 250° C. and a mold temperature of 80° C. and a cooling time of 15 seconds for the evaluations other than the mold-releasability evaluation (5), infra, and a cooling time of 10 seconds for the mold-releasability evaluation (5) below. The resin composition was dried for 6 to 8 hours at 120° C. up to just before molding.

(1) Flame Retardancy

This evaluation was carried out as described above.

(2) Impact Strength

The notched Charpy impact strength and the surface impact strength were measured as described above.

(3) Hydrolysis Resistance

This evaluation was carried out as described above.

(4) Thermal Discoloration Resistance

A plate test molding with a size of 100×100×3 mmt was injection molded and was then held for 100 hours in a convection oven at a temperature of 160° C. A color difference measurement was performed using a "CE-7000A" from GretagMacbeth (light source: D65, field: 10°, mode: SCI) on the molding before and after the test on the test specimen, and $\Delta E^*$ was determined.

(5) Mold-Releasability

A box-shaped molding (wall thickness=1.5 mm) with a size of 150 mm×80 mm×40 mm was injection molded, and the evaluation was performed by measuring, with a pressure sensor installed in the central ejector pin, the pressure applied during release of the molding from the mold (releasing resistance force, unit: MPa).

The results of these evaluations are given in the following Table 8.

TABLE 8

| | | examples | | | | | |
|---|---|---|---|---|---|---|---|
| component | code | 31 | 32 | 33 | 34 | 35 | 36 |
| polybutylene terephthalate resin (A) | A3 | 60 | 60 | 60 | 60 | 60 | 60 |
| polycarbonate resin (B) | B3 | 40 | 40 | 40 | 40 | 40 | 40 |
| flame retardant (D) | D3 | 12 | 12 | 12 | 12 | 12 | 12 |
| antimony compound (E) | E3 | 2.7 | 2.7 | 2.7 | 2.7 | 2.7 | 2.7 |
| polyolefinic mold-release agent (G) | G3-1 | 0.6 | | | | 0.6 | 0.6 |
| | G3-2 | | 0.6 | | | | |
| | G3-3 | | | 0.6 | | | |
| | G3-4 | | | | 0.6 | | |
| elastomer (C) | C3-1 | 11 | 11 | 11 | 11 | 11 | |
| | C3-2 | | | | | | 11 |
| anti-dripping agent | H3 | 0.2 | 0.2 | 0.2 | 0.2 | 0.2 | 0.2 |
| pigment | F3-1 | 3.9 | 3.9 | 3.9 | 3.9 | | |
| | F3-2 | | | | | 3.9 | 3.9 |
| stabilizer | I3-1 | 0.4 | 0.4 | 0.4 | 0.4 | 0.4 | 0.4 |
| | I3-2 | 0.4 | 0.4 | 0.4 | 0.4 | 0.4 | 0.4 |
| flame retardancy | | | | | | | |
| UL94 (1.5 mmt) | | V-0 | V-0 | V-0 | V-0 | V-0 | V-0 |
| 5V (3.0 mmt) | | 5VA | 5VA | 5VA | 5VA | 5VA | 5VA |
| impact resistance | | | | | | | |
| notched Charpy impact strength (kJ/m$^2$) | | 57 | 56 | 53 | 51 | 59 | 63 |
| surface impact strength (cm) | | >100 | >100 | >100 | >100 | >100 | >100 |
| hydrolysis resistance | | | | | | | |
| tensile strength (before treatment) | | 55 | 55 | 55 | 55 | 55 | 55 |
| tensile strength (after 75 hr treatment) | | 33 | 24 | 23 | 22 | 38 | 38 |

TABLE 8-continued

|  |  | examples | | | | | |
| --- | --- | --- | --- | --- | --- | --- | --- |
| component | code | 31 | 32 | 33 | 34 | 35 | 36 |
| thermal discoloration resistance | | | | | | | |
| ΔE* | | 1.8 | 3.5 | 1.8 | 1.7 | 1.7 | 1.7 |
| mold-releasability | | | | | | | |
| releasing resistance force (MPa) | | 10 | 9 | 10 | 11 | 10 | 10 |

Examples 41 to 46

The components used are given in Table 9 below.

TABLE 9

| Component | code | |
| --- | --- | --- |
| polybutylene terephthalate resin(A) | A4-1 | "Novaduran (registered trademark) 5009" from Mitsubishi Engineering-Plastics Corporation, intrinsic viscosity 1.0 dl/g |
| | A4-2 | "Novaduran (registered trademark) 5020" from Mitsubishi Engineering-Plastics Corporation, intrinsic viscosity 1.20 dl/g |
| polycarbonate resin(B) | B4 | "Novarex (registered trademark) 7030PJ" from Mitsubishi Engineering-Plastics Corporation, Mv = 30,000 |
| flame retardant(D) | D4 | brominated polycarbonate, product name "FR-53" from Mitsubishi Gas Chemical Company, Inc., bromine concentration: 58 mass %, free bromine content: 0.11 mass %, chlorine compound content: 0.02 mass % |
| antimony compound(E) | E4 | antimony trioxide, product name "GMA" from Yamanaka Sangyo Co., Ltd., antimony concentration: 83.5 mass % |
| elastomer(C) | C4-1 | core/shell graft copolymer of polybutylacrylate (core)/polymethyl methacrylate (shell), average particle diameter: 310 nm, glass transition temperature: −37.4° C. |
| | C4-2 | core/shell graft copolymer of polybutyl acrylate (core)/polymethyl methacrylate (shell), average particle diameter: 580 nm, glass transition temperature: −38.2° C. |
| | C4-3 | core/shell graft copolymer of butadiene (core)/methyl methacrylate, styrene (shell), average particle diameter: 185 nm, butadiene content: 77 mass %, glass transition temperature: −51.3° C. |
| anti-dripping agent | F4 | polytetrafluoroethylene, product name "TF1750" from Sumitomo 3M Limited |
| Pigment | G4 | titanium dioxide, "Tipaque CR-60" from Ishihara Sangyo Kaisha, Ltd., average particle diameter: 0.21 μm |
| Stabilizer | H4-1 | phenolic stabilizer, product name "Irganox 1010" from BASF |
| | H4-2 | zinc stearyl acid phosphate, product name "JP-518Zn" from Johoku Chemical Co., Ltd. |
| mold-release agent | I4 | oxidized polyethylene, "Licowax PED 522" from Clariant, acid value: 22 to 28 mg KOH, drop point: 102 to 107° C. |

The free bromine, chlorine, and sulfur contents in the flame retardant given above were quantitated by combustion ion chromatography. Using a model "AQF-100" automatic sample combustion station from Mitsubishi Chemical Analytech Co., Ltd., the brominated polycarbonate flame retardant was heated in an argon atmosphere at 270° C. for 10 minutes and the amounts of bromine, chlorine, and sulfur produced were measured using an "ICS-90" from Nippon Dionex KK.

The starting components listed in Table 9 above were fed at 40 kg/hr to an intermeshing co-rotating twin-screw extruder ("TEX-30α" from The Japan Steel Works, Ltd., screw diameter=32 mm, L/D=54.2) so as to provide the blending proportions (mass parts) described in Table 10 below. The antimony compound (E) was incorporated as a masterbatch of the antimony compound (E) with the polybutylene terephthalate resin (A) (content of the antimony compound (E) in the masterbatch=70 mass %). Strand extrusion was carried out at a shear rate ($\gamma$) of 211 sec$^{-1}$ using 4 nozzle orifices (circular ($\varphi$ 4 mm), length 1.5 cm) and using 200 rpm for the screw rotation rate, 250° C. for the die, and 260° C. for the set temperatures of the barrel C1 to C15 at the extruder. The strand temperature immediately after extrusion was 270° C.

The extruded strand was cooled by introduction into a water bath having a temperature adjusted into the 30 to 50° C. range. The strand surface temperature (T) was cooled to 65° C. ($\gamma \cdot T = 1.4 \times 10^4$) as the temperature measured with an infrared thermometer, and cutting was performed by introduction to a pelletizer to produce resin composition pellets.

The obtained pellets were dried by heating for 7 hours at 120° C., and an ISO tensile test specimen (thickness=4 mm) for morphological observation and test specimens for evaluation of the Charpy impact strength, surface impact strength, and flame retardancy were then injection molded using an injection molder ("J85AD" from The Japan Steel Works, Ltd.) and the following conditions: cylinder temperature=250° C., mold temperature=80° C., injection pressure=150 MPa, injection hold time=15 sec, cooling time=15 sec, injection rate=120 mm/sec, back pressure=5 MPa, and screw rotation rate=100 rpm.

(1) Morphological Observations

Using a "UC7" from Leica Microsystems GmbH, a 100 nm-thick ultrathin slice was cut out using a diamond knife from the core portion (the cross section parallel to the direction of resin composition flow, central part of the test specimen cross section, in the region excluding the surface layer having a depth of less than 20 μm) of the obtained ISO tensile test specimen (thickness=4 mm). The obtained ultrathin slice was stained for 40 minutes with ruthenium tetroxide and was then submitted to STEM observation at an acceleration voltage of 25 kV using an "S-4800" from Hitachi High-Technologies Corporation.

The following evaluations were performed based on the obtained STEM photographs.

i) Do the polybutylene terephthalate resin (A) phase and polycarbonate resin (B) phase form co-continuous phases? In Table 10 below, a "O" indicates that co-continuous phases were formed and an "x" indicates that co-continuous phases were not formed.

ii) Is the elastomer (C) present in the polycarbonate resin (B) phase? "PC phase" indicates presence in the polycarbonate resin (B) phase and "x" indicates absence from the polycarbonate resin (B) phase.

iii) Measurement of the particle diameter of the elastomer (C) phase

The maximum particle diameter was measured for 200 particles and the arithmetic average was calculated.

iv) Is the antimony compound (E) present in the polybutylene terephthalate resin (A) phase? "PBT phase" indicates that at least 80% of the antimony compound (E) is present in the polybutylene terephthalate resin (A) phase, while "x" indicates that the polybutylene terephthalate resin (A) phase does not contain at least 80% of the antimony compound (E).

The specimen used for observation of the surface layer region was the cut cross section after a 100 nm-thick ultrathin slice of the surface layer region (surface layer region to a depth of less than 20 µm) in the cross section of the obtained ISO tensile test specimen had been cut out with a diamond knife using a "UC7" from Leica Microsystems GmbH. The obtained cut cross section was stained for 40 minutes with ruthenium tetroxide and was then submitted to SEM observation at an acceleration voltage of 3 kV using an "SU8020" from Hitachi High-Technologies Corporation.

The following evaluations were performed based on the obtained SEM photographs.

v) Does the elastomer (C) phase extend in the resin flow direction ("O" for does extend, "x" for does not extend)?

vi) Measurement of the ratio between the long diameter and the short diameter for the elastomer (C) phase The long diameter and short diameter were measured on 200 elastomer (C) phases and the arithmetic average of the long diameter/short diameter ratio was determined. The long diameter was taken to be the maximum diameter of the elastomer particle, and the short diameter was taken to be the maximum diameter among the diameters in the direction perpendicular to the long diameter.

With regard to the core portion of the molded article of Example 41, which is shown in both FIGS. 1 and 2, it could be confirmed that the polybutylene terephthalate resin (A) phase and the polycarbonate resin (B) phase formed co-continuous phases; that the elastomer (C) was present in the polycarbonate resin (B) phase; and that at least 80% of the antimony compound (E) was present uniformly dispersed in the polybutylene terephthalate resin (A) phase. It is thought that the flame retardant is present in the polycarbonate resin (B) phase in Example 41 due to the use of a brominated polycarbonate as the flame retardant. In addition, it could also be confirmed from FIG. 3, which shows the surface layer portion in Example 41, that the elastomer (C) phase in the surface layer portion extends in the direction of resin flow. The molded articles of Examples 42 to 46 were also confirmed to present the same morphology.

Moreover, as a result of performing the same morphological observations also with the test specimens for the property evaluations indicated below, the same morphological observation results as for the aforementioned ISO tensile test specimen (thickness=4 mm) for morphological observation were confirmed for the examples and comparative examples that were carried out.

The flame retardancy and impact resistance were evaluated as described above.

The results of these evaluations are given in Table 10 below.

TABLE 10

| | | examples | | | | | |
|---|---|---|---|---|---|---|---|
| component | code | 41 | 42 | 43 | 44 | 45 | 46 |
| polybutylene terephthalate resin (A) | A4-1 | | | | | 58 | 58 |
| | A4-2 | 58 | 58 | 58 | | | 58 |
| polycarbonate resin (B) | B4 | 42 | 42 | 42 | 42 | 42 | 42 |
| flame retardant (D) | D4 | 12 | 12 | 12 | 12 | 12 | 12 |

TABLE 10-continued

| | | examples | | | | | |
|---|---|---|---|---|---|---|---|
| component | code | 41 | 42 | 43 | 44 | 45 | 46 |
| antimony compound (E) | E4 | 2.7 | 2.6 | 2.7 | 2.7 | 2.7 | 2.6 |
| elastomer (C) | C4-1 | | 11 | 11 | 11 | | |
| | C4-2 | 11 | | | | 11 | |
| | C4-3 | | | | | | 11 |
| anti-dripping agent | F4 | 0.2 | 0.2 | 0.2 | 0.2 | 0.2 | 0.2 |
| pigment | G4 | 3.9 | | 3.9 | 3.9 | 3.9 | 3.9 |
| stabilizer | H4-1 | 0.4 | 0.4 | 0.4 | 0.4 | 0.4 | 0.4 |
| | H4-2 | 0.4 | 0.4 | 0.4 | 0.4 | 0.4 | 0.4 |
| mold-release agent | I4 | 0.6 | 0.6 | 0.6 | 0.6 | 0.6 | 0.6 |
| flame retardancy | | | | | | | |
| UL94 (1.5 mmt) | | V-0 | V-0 | V-0 | V-0 | V-0 | V-0 |
| 5V (3.0 mmt) | | 5VA | 5VA | 5VA | 5VA | 5VA | 5VA |
| notched Charpy impact strength (kJ/m$^2$) | | 58 | 48 | 54 | 42 | 50 | 42 |
| surface impact strength (cm) | | >100 | >100 | >100 | >100 | >100 | >100 |
| morphology of the molded article | | | | | | | |
| co-continuous structure | | O | O | O | O | O | O |
| elastomer | | PC phase | PC phase | PC phase | PC phase | PC phase | PC phase |
| particle diameter of the elastomer phase (nm) | | 580 | 320 | 310 | 318 | 577 | 194 |
| flame retardant | | PC phase | PC phase | PC phase | PC phase | PC phase | PC phase |
| antimony compound | | PBT phase | PBT phase | PBT phase | PBT phase | PBT phase | PBT phase |
| status of orientation of the elastomer in the surface layer | | O | O | O | O | O | O |
| long diameter/short diameter for the elastomer in the surface layer | | 13.8 | 9.1 | 9.4 | 6.1 | 9.1 | 6.2 |

Examples 51 to 57

Production of the Antimony Compound Masterbatch

Antimony Compound Masterbatch Production Example 1: Production of "MB1"

30 mass parts of a polybutylene terephthalate resin (1:1 mixture of product name "Novaduran (registered trademark) 5020" from Mitsubishi Engineering-Plastics Corporation, which has an intrinsic viscosity of 1.20 dl/g, and product name "Novaduran 5008" from Mitsubishi Engineering-Plastics Corporation, which has an intrinsic viscosity of 0.85 dl/g) that had been preliminarily convection dried for 3 hours at 120° C. and 70 mass parts of an antimony compound (product name "GMA" from Yamanaka Sangyo Co., Ltd.) were fed at 300 kg/hr to an intermeshing co-rotating twin-screw extruder ("TEX44αII" from The Japan Steel Works, Ltd., screw diameter=47 mm, L/D=55.2). Melt kneading was carried out at a shear rate (γ) of 1012 sec$^{-1}$ using 10 nozzle orifices (circular (φ 4 mm), length 1.5 cm) and using 230 rpm for the screw rotation rate, 250° C. for the die, and 260° C. for the barrel set temperatures of the barrel C1 to C15 at the extruder. The strand temperature immediately after extrusion was 290° C.

After melt kneading, the resin composition was extruded into strand form from the die nozzles and was thereafter cooled and cut to obtain a masterbatch (referred to as "MB1" hereafter) that contained 70 mass % antimony compound and was provided by the kneading of the antimony compound with polybutylene terephthalate resin.

Antimony Compound Masterbatch Production Example 2: Production of "MB2"

A masterbatch (referred to as "MB2" hereafter) that contained 70 mass % antimony compound and was provided by the kneading of the antimony compound with polybutylene terephthalate resin was obtained under the same conditions as in Production Example 1, except that only product name "Novaduran 5007" from Mitsubishi Engineering-Plastics Corporation, which has an intrinsic viscosity of 0.75 dl/g, was used as the polybutylene terephthalate resin.

Antimony Compound Masterbatch Production Example 3: Production of "MB3"

A masterbatch (referred to as "MB3" hereafter) that contained 70 mass % antimony compound and was provided by the kneading of the antimony compound with polybutylene terephthalate resin was obtained under the same conditions as in Production Example 1, except that only product name "Novaduran 5006" from Mitsubishi Engineering-Plastics Corporation, which has an intrinsic viscosity of 0.60 dl/g, was used as the polybutylene terephthalate resin. Strand breakage occurred to some extent during production of the masterbatch because it was difficult to pull the strand.

Antimony Compound Masterbatch Production Example 4: Production of "MB4"

This was carried out under the same conditions as in Production Example 1, except that only product name "Novaduran 5026" from Mitsubishi Engineering-Plastics Corporation, which has an intrinsic viscosity of 1.26 dl/g, was used as the polybutylene terephthalate resin. When carried out at 260° C. for the barrel set temperatures of the barrel C1 to C15 of the extruder, resin overflowed from the vents and it was difficult to stably pull the strand and stable production was impaired. Due to this, production was carried out with the set temperatures of the barrel C1 to C15 raised to 280° C., and a masterbatch (referred to as "MB4" hereafter) that contained 70 mass % antimony compound and was provided by the kneading of the antimony compound with polybutylene terephthalate resin was obtained.

Antimony Compound Masterbatch Production Example 5: Production of "MB5"

A masterbatch (referred to as "MB5" hereafter) that contained 80 mass % antimony compound and was provided by the kneading of the antimony compound with polybutylene terephthalate resin was obtained under the same conditions as in Production Example 1, except that 20 mass parts for the amount of the polybutylene terephthalate resin mixture and 80 mass parts for the amount of the antimony compound was used.

<Production of Polybutylene Terephthalate Resin Compositions>

The starting components used are given in Table 11 below.

TABLE 11

| component | code | |
|---|---|---|
| polyester resin(A) | A5 | "Novaduran (registered trademark) 5026" from Mitsubishi Engineering-Plastics Corporation, intrinsic viscosity 1.26 dl/g |
| polycarbonate resin(B) | B5 | "Novarex (registered trademark) 7030PJ" from Mitsubishi Engineering-Plastics Corporation, Mv = 30,000 |

TABLE 11-continued

| component | code | |
|---|---|---|
| core/shell elastomer(C) | C5 | core/shell elastomer of polybutyl acrylate (core)/polymethyl methacrylate (shell), primary particle diameter: 600 nm, glass transition temperature: −38.2° C. |
| flame retardant(D) | D5 | brominated polycarbonate, product name "FR-53" from Mitsubishi Gas Chemical Company, Inc. |
| antimony compound(E) | E5 | antimony trioxide, product name "GMA" from Yamanaka Sangyo Co., Ltd. |
| antimony compound(E) masterbatch | MB1 | antimony compound masterbatch MB1 obtained in Production Example 1, antimony trioxide content: 70 mass % |
| | MB2 | antimony compound masterbatch MB2 obtained in Production Example 2, antimony trioxide content: 70 mass % |
| | MB3 | antimony compound masterbatch MB3 obtained in Production Example 3, antimony trioxide content: 70 mass % |
| | MB4 | antimony compound masterbatch MB4 obtained in Production Example 4, antimony trioxide content: 70 mass % |
| | MB5 | antimony compound masterbatch MB5 obtained in Production Example 5, antimony trioxide content: 80 mass % |
| anti-dripping agent | F5 | polytetrafluoroethylene, product name "TF1750" from Sumitomo 3M Limited |
| pigment | G5 | titanium oxide, product name "CR-60" from Ishihara Sangyo Kaisha, Ltd. |
| stabilizer | H5-1 | phenolic stabilizer, product name "Irganox 1010" from BASF |
| | H5-2 | phosphorus stabilizer, zinc stearyl acid phosphate, product name "JP-518Zn" from Johoku Chemical Co. |
| mold-release agent | I5 | oxidized polyethylene, "Licowax PED 522" from Clariant, acid value: 22 to 28 mg KOH, drop point: 102 to 107° C. |

Among the components listed in Table 11, the antimony compound masterbatch (MB1 to MB5) was fed from an independent dedicated feeder and the other components were blended and fed from a root feeder, into the hopper at the proportions (mass parts in all instances) shown in Table 12 below, and these were melt kneaded using a 30 mm vented twin-screw extruder ("TEX30α" twin-screw extruder from The Japan Steel Works, Ltd.) at a barrel temperature of 270° C., an extrusion rate of 80 kg/hr, and a screw rotation rate of 280 rpm. After extrusion into strand, pelletizing was carried out with a strand cutter to obtain pellets of the polybutylene terephthalate resin composition.

In Example 56, rather than using the independent dedicated feeder, the polybutylene terephthalate resin composition pellets were obtained by blending the antimony compound masterbatch (MB1) together with the other components and carrying out a combined feed from the root feeder.

The obtained polybutylene terephthalate resin composition pellets were dried by heating for 7 hours at 120° C. and were injection molded into flame retardancy and impact resistance test specimens using an injection molder ("J85AD" from The Japan Steel Works, Ltd.) at a cylinder temperature of 250° C. and a mold temperature of 80° C.

The productivity, flame retardancy, impact resistance and crystallization temperature were evaluated as follows.

Productivity (Strand Stability)

A 10-hour long-run production was carried out while melt kneading the polybutylene terephthalate resin composition pellets, and the degree of strand breakage per hour was evaluated using the following criteria and was used as an index for production stability.

"stable": no strand breakage

"somewhat unstable": 1 to 2

Flame Retardancy (UL94):

The flame retardancy was tested using five test specimens (thickness: 1.50 mmt) based on the method in Underwriters Laboratories Subject 94 (UL94).

The burning total time (sum of the burning times after the first flame application and after the second flame application) was measured for each of the combustion test specimens, and the variability in the burning time was evaluated using the standard deviation value. The sum of the burning total times for the five test specimens is given in Table 12 as the overall burning time.

Notched Charpy Impact Strength:

ISO test specimens (thickness=4.0 mm) were injection molded; notched test specimens with a thickness of 4.0 mm were fabricated from these test specimens; and the notched Charpy impact strength (unit: $kJ/m^2$) was measured in conformity with the ISO 179 standard on ten test specimens. The variability in the Charpy impact strength was evaluated as the standard deviation value.

Surface Impact Strength:

A box-shaped molding (wall thickness=1.5 mmt) with a size of 150×80×40 mm was molded; a 2.975 kg steel ball was dropped on it from a prescribed height; and the height (unit: cm) at which the molding underwent complete rupture was determined. The test was run to a height of 205 cm, and the absence of rupture at 205 cm is indicated by ">200" in Table 12.

Crystallization Temperature:

Using a differential scanning calorimeter (DSC) instrument ("Pyris Diamond" from PerkinElmer Inc.), the temperature was raised from 30 to 300° C. at a rate of temperature increase of 20° C./minute and held for 3 minutes at 300° C. This was followed by cooling at a rate of temperature decline of 20° C./minute, and the peak top temperature of the exothermic peak observed during this interval was measured and taken to be the crystallization temperature (unit: ° C.). The exothermic peak is observed due to crystallization, and a higher crystallization temperature indicates a better suppression of transesterification between the polybutylene terephthalate resin and the polycarbonate resin and thus a better thermal stability during the molding process and hence is preferred.

The results of these evaluations are given in Table 12.

TABLE 12

| component | code | examples | | | | | | |
|---|---|---|---|---|---|---|---|---|
| | | 51 | 52 | 53 | 54 | 55 | 56 | 57 |
| polybutylene terephthalate resin | A5 | 60 | 60 | 60 | 60 | 60 | 60 | 60 |
| polycarbonate resin | B5 | 40 | 40 | 40 | 40 | 40 | 40 | 40 |
| core/shell elastomer | C5 | 10.4 | 10.4 | 10.4 | 10.4 | 10.4 | 10.4 | 10.3 |
| flame retardant | D5 | 11.1 | 11.1 | 11.1 | 11.1 | 11.1 | 11.1 | 10.9 |
| antimony compound | E5 | | | | | | | 2.6 |
| antimony compound masterbatch | MB1 | 3.7 | | | | | 3.7 | |
| | MB2 | | 3.8 | | | | | |
| | MB3 | | | 3.8 | | | | |
| | MB4 | | | | 3.8 | | | |
| | MB5 | | | | | 3.3 | | |
| anti-dripping agent | F5 | 0.1 | 0.1 | 0.1 | 0.1 | 0.1 | 0.1 | 0.1 |
| pigment | G5 | 3.9 | 3.9 | 3.9 | 3.9 | 3.9 | 3.9 | 3.9 |
| stabilizer | H5-1 | 0.3 | 0.3 | 0.3 | 0.3 | 0.3 | 0.3 | 0.3 |
| | H5-2 | 0.3 | 0.3 | 0.3 | 0.3 | 0.3 | 0.3 | 0.3 |
| mold-release agent | I5 | 0.4 | 0.4 | 0.4 | 0.4 | 0.4 | 0.4 | 0.4 |
| masterbatch feed method | | single feed | single feed | single feed | single feed | single feed | combined feed | single feed |
| productivity (strand stability) | | stable | stable | stable | stable | stable | somewhat unstable | somewhat unstable |
| flame retardancy/UL 94 | | | | | | | | |
| thickness evaluated (mmt) | | 1.50 | 1.50 | 1.50 | 1.50 | 1.50 | 1.50 | 1.50 |
| rating | | V-0 | V-0 | V-0 | V-0 | V-0 | V-0 | V-0 |
| burning total time (sec) | first specimen | 2 | 2 | 3 | 3 | 3 | 5 | 6 |
| | second specimen | 2 | 2 | 3 | 4 | 3 | 9 | 4 |
| | third specimen | 3 | 3 | 3 | 3 | 2 | 1 | 9 |
| | fourth specimen | 2 | 2 | 2 | 4 | 3 | 3 | 4 |
| | fifth specimen | 3 | 2 | 2 | 3 | 2 | 4 | 9 |
| overall burning time (sec) | | 12 | 11 | 13 | 17 | 13 | 22 | 32 |
| burning time variability | | 0.55 | 0.45 | 0.55 | 0.55 | 0.55 | 2.97 | 2.51 |
| impact resistance notched Charpy impact strength ($kJ/m^2$) | 1 | 55.7 | 53.3 | 52.2 | 54.3 | 52.2 | 18.8 | 48.3 |
| | 2 | 55.3 | 53.3 | 55.5 | 55.4 | 51.2 | 19.8 | 42.1 |
| | 3 | 55.4 | 53.3 | 51.4 | 55.6 | 52.2 | 53.2 | 46.3 |
| | 4 | 55.3 | 55.3 | 55.2 | 54.3 | 51.1 | 35.8 | 38.8 |
| | 5 | 55.4 | 55.6 | 55.8 | 55.3 | 52.2 | 55.3 | 35.8 |
| | 6 | 55.4 | 55.8 | 53.4 | 54.3 | 52.2 | 48.2 | 46.4 |
| | 7 | 54.3 | 55.9 | 54.2 | 55.3 | 52.1 | 28.9 | 48.6 |
| | 8 | 55.4 | 55.3 | 52.1 | 54.5 | 53.3 | 19.9 | 48.2 |

TABLE 12-continued

| component | code | 51 | 52 | 53 | 54 | 55 | 56 | 57 |
|---|---|---|---|---|---|---|---|---|
|  | 9 | 55.4 | 53.7 | 52.1 | 55.4 | 54.4 | 18.8 | 38.8 |
|  | 10 | 55.3 | 52.1 | 52.2 | 55.3 | 51.1 | 55.3 | 46.8 |
|  | avg. | 55.3 | 54.4 | 53.4 | 55.2 | 52.2 | 43.2 | 44.0 |
| Charpy impact strength variability |  | 0.37 | 1.36 | 1.64 | 0.54 | 1.03 | 16.16 | 4.73 |
| surface impact strength (cm) |  | >200 | >200 | >200 | >200 | >200 | 200 | 180 |
| crystallization temperature (° C.) |  | 150 | 150 | 151 | 150 | 150 | 151 | none |

INDUSTRIAL APPLICABILITY

The polybutylene terephthalate resin composition of the present invention exhibits an excellent impact resistance, flame retardancy, heat aging resistance, lightfastness, and moist heat resistance and also has an excellent moldability and is therefore advantageously used for electrical and electronic parts, automotive parts and other electrical parts, mechanical parts, and parts for household appliances such as cookware, for example, for charger connectors for electric automobiles, battery capacitor holders, battery capacitor housings, housings for charging stands for electric automobiles, housings for electrical and electronic equipments, connectors, relays, switches, sensors, actuators, terminal switches, parts for rice cookers, parts for grilling cookware, and so forth, and thus has a very high industrial applicability.

The invention claimed is:

1. A polybutylene terephthalate resin composition comprising a 50 to 80 mass parts of a polybutylene terephthalate resin (A) and 20 to 50 mass parts of a polycarbonate resin (B) per 100 mass parts of the total of (A) and (B), and further comprising, per 100 mass parts of the total of (A) and (B), 5 to 20 mass parts of an elastomer (C), 5 to 40 mass parts of a flame retardant (D), 1 to 15 mass parts of an antimony compound (E), and 0.5 to 10 mass pans of a titanium oxide (F) that has been subjected to a surface treatment with an alumina compound and an organosiloxane compound, wherein the elastomer (C) is an acrylic core/shell graft copolymer in which both the core and shell are an acrylate ester.

2. The polybutylene terephthalate resin composition according to claim 1, wherein the polycarbonate resin (B) has a viscosity-average molecular weight of more than 28,000.

3. The polybutylene terephthalate resin composition according to claim 1, wherein the elastomer (C) is an acrylic core/shell graft copolymer having a polybutyl acrylate core and a polymethyl methacrylate shell.

4. The polybutylene terephthalate resin composition according to claim 1, wherein the average particle diameter of the elastomer (C) is 1 μm or less.

5. The polybutylene terephthalate resin composition according to claim 1, wherein the flame retardant (D) is a brominated polycarbonate flame retardant.

6. The polybutylene terephthalate resin composition according to claim 1, wherein the antimony compound (E) is incorporated as a masterbatch with the polybutylene terephthalate resin (A).

7. The polybutylene terephthalate resin composition according to claim 1, further comprising a polyolefinic release agent (G) at 0.01 to 3 mass parts per 100 mass parts of the total of (A) and (B).

8. The polybutylene terephthalate resin composition according to claim 7, wherein a drop point of the polyolefinic release agent (G) is not more than 100° C.

9. The polybutylene terephthalate resin composition according to claim 1, further comprising 0.001 to 1 mass parts, per 100 mass parts of the total of (A) and (B), of a metal salt (H) of an organophosphate ester compound represented by any of the following formulas (1) to (4):

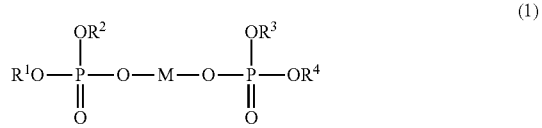

(1)

wherein in formula (1), $R^1$ to $R^4$ are each independently an alkyl group having 1 to 30 carbons or an aryl group having 6 to 30 carbons and M is an alkaline-earth metal or zinc,

(2)

in formula (2), $R^5$ is an alkyl group having 1 to 30 carbons or an aryl group having 6 to 30 carbons and M is an alkaline-earth metal or zinc,

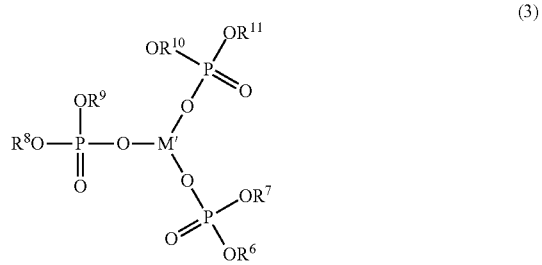

(3)

in formula (3), $R^6$ to $R^{11}$ are each independently an alkyl group having 1 to 30 carbons or an aryl group having 6 to 30 carbons and M' is a metal atom to form a trivalent metal ion, and

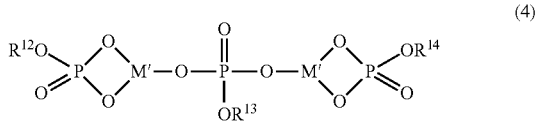 (4)

in formula (4), $R^{12}$ to $R^{14}$ are each independently an alkyl group having 1 to 30 carbons or an aryl group having 6 to 30 carbons; M' is a metal atom to form a trivalent metal ion; and two M' may be the same or may differ from one another.

10. A molded article formed by molding the polybutylene terephthalate resin composition according to claim 1.

11. The molded article according to claim 10, having a morphology in which in a core portion of the molded article, the polybutylene terephthalate resin (A) and the polycarbonate resin (B) form co-continuous phases and the elastomer (C) is present in the polycarbonate resin (B) phase.

12. The molded article according to claim 10, wherein in a core portion of the molded article, at least 80% of the antimony compound (E) is present in the polybutylene terephthalate resin (A) phase.

13. The molded article according to claim 10, wherein in a surface layer portion of the molded article, the elastomer (C) phase extends in a resin flow direction and a ratio between a long diameter and a short diameter (long diameter/short diameter) thereof is from 3 to 20.

14. The molded article according to claim 10, wherein the flame retardant (D) is present in the polycarbonate resin (B) phase.

15. The molded article according to claim 10, which is at least one selected from the group consisting of a charger connector for an electric automobile, a battery capacitor holder, a housing for a battery capacitor, or a housing for a charging stand for an electric automobile.

\* \* \* \* \*